(12) United States Patent
Kure et al.

(10) Patent No.: US 8,964,921 B2
(45) Date of Patent: Feb. 24, 2015

(54) INFORMATION PROCESSING APPARATUS, METHOD, AND PROGRAM

(75) Inventors: Yoshinobu Kure, Kanagawa (JP); Hideaki Murayama, Kanagawa (JP); Tamotsu Munakata, Kanagawa (JP); Chihiro Fujita, Kanagawa (JP); Osamu Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 13/814,273

(22) PCT Filed: Aug. 3, 2011

(86) PCT No.: PCT/JP2011/067802
§ 371 (c)(1),
(2), (4) Date: Feb. 5, 2013

(87) PCT Pub. No.: WO2012/020686
PCT Pub. Date: Feb. 16, 2012

(65) Prior Publication Data
US 2013/0136218 A1    May 30, 2013

(30) Foreign Application Priority Data
Aug. 12, 2010   (JP) .................... 2010-180946

(51) Int. Cl.
| H04L 7/00 | (2006.01) |
| H04N 19/00 | (2014.01) |
| H04N 21/44 | (2011.01) |
| H04N 21/6375 | (2011.01) |
| H04J 3/06 | (2006.01) |
| H04L 12/853 | (2013.01) |
| H04L 12/841 | (2013.01) |

(52) U.S. Cl.
CPC ............... *H04L 7/0041* (2013.01); *H04N 7/26* (2013.01); *H04N 21/44004* (2013.01); *H04N 21/6375* (2013.01); *H04J 3/0632* (2013.01); *H04L 47/2416* (2013.01); *H04L 47/28* (2013.01)
USPC ............ 375/356; 375/355; 375/373; 375/376

(58) Field of Classification Search
USPC .................................. 375/356, 355, 373, 376
See application file for complete search history.

(56) References Cited

U.S. PATENT DOCUMENTS

2007/0269122 A1    11/2007   Fukuhara et al.
2010/0022302 A1*   1/2010   Iwakiri et al. ................... 463/30

FOREIGN PATENT DOCUMENTS

| CN | 101076118 | 11/2007 |
| JP | 2002-185850 | 6/2002 |

(Continued)

OTHER PUBLICATIONS

Office Action issued in corresponding Japanese Application No. 2010-180946 dated Sep. 4,2014.

*Primary Examiner* — Kabir A Timory
(74) *Attorney, Agent, or Firm* — Frommer Lawrence & Haug LLP; William S. Frommer

(57) ABSTRACT

The present invention relates to an information processing apparatus, a method, and a program capable of suppressing deterioration of content quality. An integrated reception buffer time adjustment unit 114 obtains a maximum transmission delay time that is the longest delay time among the transmission delays of data transmission performed by each reception unit 113. The reception buffer time setting unit 208 calculates a reception buffer time using the maximum transmission delay time, a transmission delay time of the data transmission by the reception unit 113, and a prescribed reception buffer time. The reception buffer time setting unit 208 sets various delay times and waiting times such as a variable compression encoding delay time, a redundant encoding block reception waiting time, an ARQ retransmission packet waiting time, and a network jitter handling buffer time from the reception buffer time. The present invention can be applied to an information processing apparatus, for example.

9 Claims, 19 Drawing Sheets

(56) References Cited

FOREIGN PATENT DOCUMENTS

| | | |
|---|---|---|
| JP | 2007-27813 | 2/2007 |
| JP | 2007-311924 | 11/2007 |
| JP | 2008-288901 | 11/2008 |
| JP | 2010-34995 | 2/2010 |
| KR | 10-2007-01113361 | 11/2007 |

* cited by examiner

INFORMATION PROCESSING APPARATUS, METHOD, AND PROGRAM

TECHNICAL FIELD

The present invention relates to an information processing apparatus, a method, and a program, and especially relates to an information processing apparatus, a method, and a program that are capable of suppressing deterioration of content quality.

BACKGROUND ART

In recent years, there has been a growing demand for transmission of multimedia data with a low delay while performing media reference signal synchronization (so-called "GENLOCK synchronization") via the internet, a local area, network (LAN), or other transmission line.

For example, there is a system in which a camera and its control unit (so-called "camera control unit" (CCU)) are connected with a high definition serial digital interface (HD-SDI) cable and uncompressed synchronization transmission is performed in a broadcasting station. In recent years, the HD-SDI cable of this system has been replaced with an Ethernet (trademark) cable and the transmission has been performed on the Ethernet (trademark) while performing GENLOCK synchronization with an IP packet.

For such a purpose, when IP transmission of multimedia data is performed, the usability is required, which is equivalent to that of the transmission via the HD-SDI cable. Therefore, highly accurate GENLOCK synchronization and low delay transmission equal to or less than a video frame interval are required.

In response to the request, a system is proposed in which every several numbers of lines of each picture of a moving image is encoded as one encoding block (a line block) by wavelet transformation (for example, see Patent Document 1).

In this system, the encoding is started without waiting an input of all of data in a picture. Therefore, when generated, encoded data is transmitted via a network and is decoded at a reception side, a decoding process can be started before receiving all of the data in the picture. That is, if a network propagation delay is substantially small, real time (instantaneous) moving image transmission with a delay equal to or less than the frame interval becomes possible.

In such data transmission, it is necessary for a reception device to buffer (temporarily hold) received data in order to deal with a delay in an encoding process, in a data transmission process, in a QoS control process, and the like. In other words, setting of the encoding process, the QoS control process, and the like is performed (not to overflow) in accordance with a buffer time at a receiving side. That is, image quality of decoded image or transmission quality depends on the buffer time.

By the way, in a conventional system, when data is transmitted by this data transmission from a plurality of transmission devices to one reception device, reception buffer times with respect to the transmission devices are set independently of each other, or, are set to be a predetermined time (a common reception buffer time is used).

CITATION LIST

Patent Document

Patent Document 1: Japanese Patent No. 4371120

SUMMARY OF THE INVENTION

Problems to be Solved by the Invention

However, typically, delays (transmission delays) in relation to the data transmission from the transmission devices often differ from each other because a line, a band width, and the like of the data transmission differ from each other. However, in a case, of a conventional, system, the setting of a reception buffer time is carried, out without considering the difference of the transmission delays (the settings are done independently of each other or are commonly set).

As described above, the setting of encoding, control of QoS, and the like is performed based on the reception buffer time. Therefore, in practice, even in a case where reception data is held longer than the reception buffer time, there is a concern that the image quality of a decoded image or the transmission quality cannot be improved. That is, there is a concern of causing an unnecessary waiting time. In other word, there is a concern that the content quality is unnecessarily deteriorated by the data transmission.

The present invention has been made in view of the foregoing, and a purpose of the invention is to use a spare time of each process for improving the image quality and the transmission quality and to decrease an unnecessary delay time.

Solutions to Problems

One aspect of the present invention is an information processing apparatus, including: an adjustment means configured to adjust, in data transmission for transmitting mutually synchronized data from a plurality of transmission devices to a reception device, a reception buffer time that is a buffer time for synchronizing each of the data in the reception device and is set for each of the data transmission using a difference in transmission delays that are a delay time generated in a transmission line of each of the data transmission; and a setting means configured to set a parameter of a process in relation to each of the data transmission using the reception buffer time adjusted by the adjustment means.

The adjustment means may obtain a maximum value of the transmission delays, and obtain the reception buffer time by adding a difference between the transmission delay of each of the data and the maximum value to a prescribed reception buffer time that is a predetermined reception buffer time.

The process in relation to the data transmission may be a QoS control process of the data transmission, and the setting means may set, as the parameter of the QoS control process, a redundant encoding block reception waiting time that is a time from when a head packet of a redundant encoding block is received until a tailing packet of the redundant encoding block is received, a retransmission packet waiting time that is a time for waiting a retransmission packet, and a network jitter handling buffer time for absorbing a network jitter.

The data may be encoded in a transmission source, obtained encoded data may be transmitted, and the encoded data may be decoded in a transmission destination, and the setting means may set, as the parameter of the process, a variable compression encoding delay request time necessary when the encoded data rate-controlled and generated at the encoding is subjected to smoothing-transmission.

The information processing apparatus may further include: a reception means configured to receive an image quality request that is a request in relation to image quality of the data and a transmission quality request that is a request in relation to transmission quality in the data transmission, wherein the adjustment means may adjust the reception buffer time based on the image quality request and the transmission quality request received by the reception means.

The adjustment means may set a provisional reception buffer time based on the image quality request and the transmission quality request received by the reception means, and adjust the reception buffer time based on the provisional reception buffer time.

The information processing apparatus may further include: an output means configured to display a GUI supporting an input of the image quality request and the transmission quality request received by the reception means.

One aspect of the present invention is an information processing method to be performed by an information processing apparatus, including: in data transmission for transmitting mutually synchronized data from a plurality of transmission devices to a reception device, adjusting, by an adjustment means of the information processing apparatus, a reception buffer time that is a buffer time for synchronizing each of the data in the reception device and is set for each of the data transmission using a difference in transmission delays that are a delay time generated in a transmission line of each of the data transmission; and setting, by a setting means of the information processing apparatus, a parameter of a process in relation to each of the data transmission using the adjusted reception buffer time.

Further, one aspect of the present invention is a program for causing a computer, which performs data transmission, to function as: an adjustment means that adjusts, in data transmission for transmitting mutually synchronized data from, a plurality of transmission devices to a reception device, a reception buffer time, which is a buffer time for synchronizing each of the data in the reception device and is set for each of the data transmission, using a difference in transmission delays that are a delay time generated in a transmission line of each of the data transmission; and a setting means that sets a parameter of a process in relation to each of the data transmission using the reception buffer time adjusted by the adjustment means.

In one aspect of the present invention, in data transmission for transmitting mutually synchronized data from a plurality of transmission devices to a reception device, a reception buffer time, which is a buffer time for synchronizing each of the data in the reception device and is set for each of the data transmission, is adjusted using a difference in transmission delays that are a delay time generated in a transmission line of each of the data transmission; and a parameter of a process in relation to each of the data transmission is set using the adjusted reception buffer time.

Effects of the Invention

According to the present invention, data can be transmitted. Especially, deterioration of content quality can be suppressed.

MODE FOR CARRYING OUT THE INVENTION

Modes for carrying out the invention (hereinafter, referred to as embodiments) will be herein described. Note that description will be given in the following order.
1. First embodiment (transmission system)
2. Second embodiment (transmission system)
3. Third embodiment (personal computer)

1. First Embodiment

[An Outline of a Transmission System]

Figure 1:
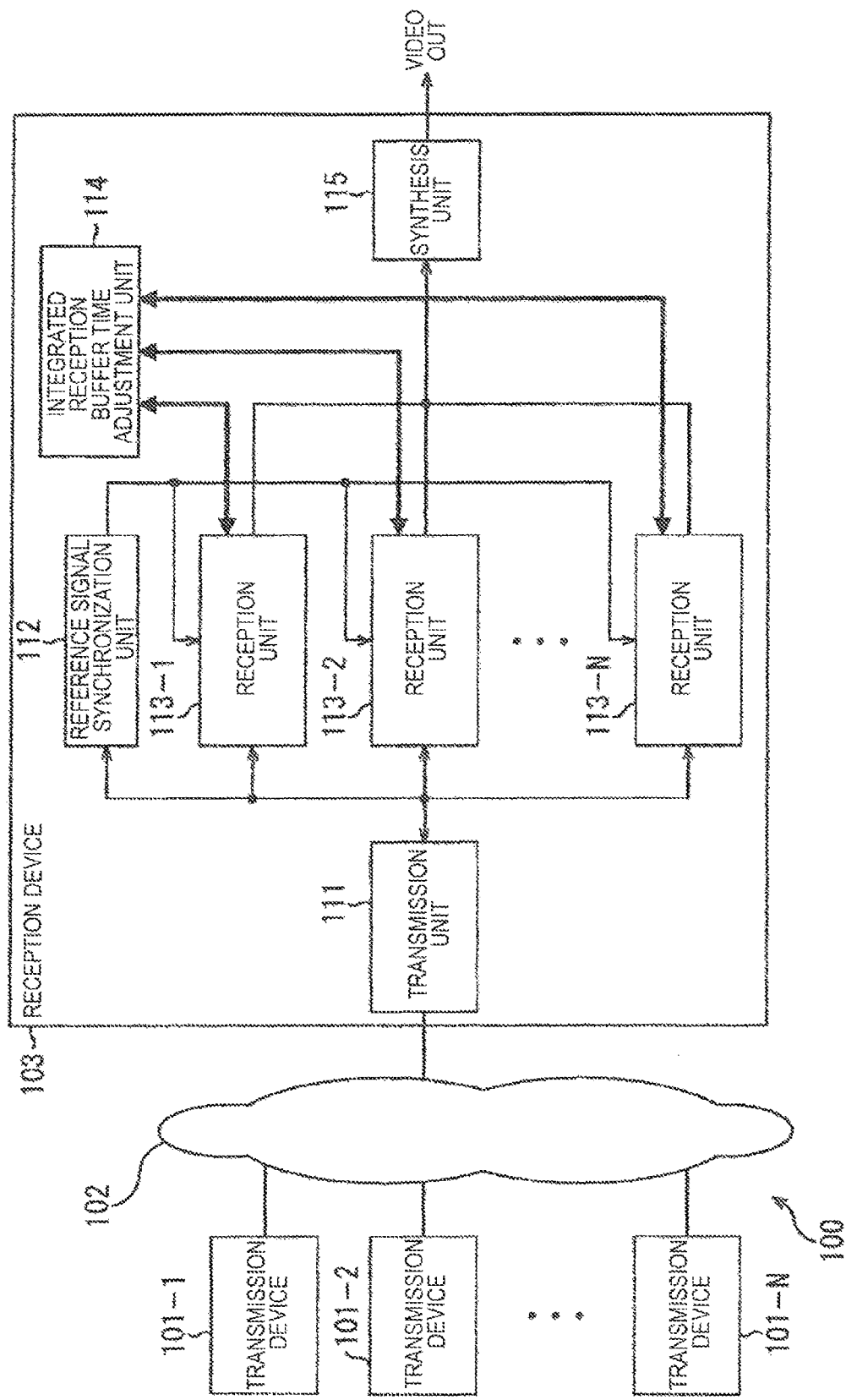
FIG. 1 is a block diagram showing a main configuration example of a transmission system to which the present invention is applied.

FIG. 1 is a block diagram showing a main configuration example of a transmission system to which the present invention is applied. A transmission system 100 is a system that transmits image data from a plurality of transmission devices (transmission devices 101-1 to 101-N (N is an integer equal to or more than 2)) to a reception device 103 via a network 102 that is a general purpose transmission line such as the internet and a LAN. Hereinafter, in a case where it is not necessary to describe the transmission devices to distinguish from one another, the transmission devices are simply referred to as the transmission device 101. Mote that the network 102 includes not only a cable and the like, but also a device such as a router and a hub.

Image data (video data) input to each transmission device 101 is transmitted to the reception device 103 via the network 102 in real time (instantaneously) and is output from the reception device 103. That is, the video data input to each transmission device 101 with a predetermined frame rate (for example, a frame rate at normal reproduction) is encoded in the transmission device 101, is transmitted to the reception device 103 as encoded data, is decoded in the reception device 103, and is output from the reception device 103 at a predetermined frame rate (for example, a frame rate at normal reproduction) with a predetermined delay time.

The reception device 103 synthesizes data from the transmission devices 101 in synchronization with each other and outputs (reproduces) it. That is, data transmission from each transmission device 101 is performed not to deteriorate such synchronization reproduction.

In recent years, there has been a growing demand for transmitting multimedia data with a low delay while performing media reference signal synchronization (so-called "GEN-LOCK synchronization") via a general-purpose transmission line such as the internet and a local area network (LAN).

For example, in a broadcasting station, a camera and its control unit (so-called "camera control unit" (CCU)) are connected with an HD-SDI cable and uncompressed synchronization transmission is performed therebetween. In recent years, this HD-SDI cable has been replaced with an Ethernet (trademark) cable and the transmission has been performed on the Ethernet (trademark) while performing GENLOCK synchronization with an IP packet.

For such a purpose, when IP transmission of multimedia data is performed, the usability equivalent to that of the transmission via the HD-SDI cable is required. Therefore, highly accurate GENLOCK synchronization and low delay transmission equal to or less than a video frame interval or less are required.

To respond to the request, the Patent Document 1 proposes a system of encoding every several numbers of lines of each picture of a moving image as one encoding block (a line block). In this system, the transmission device 101 is capable of starting the encoding without waiting an input of all of data in the picture. Also, the transmission device 101 is capable of sequentially transmitting encoded data obtained by the encoding to the reception device 103 via the network 102.

Further, the reception device 103 is capable of starting decoding before receiving all of data in the picture. If a transmission delay of the network 102 (a delay generated in the network 102 in the data transmission from the transmission device 101 to the reception device 103) is sufficiently small, real-time moving image transmission with a delay equal to or less than a frame interval (data transmission capable of outputting from the reception device 103 with a frame rate at the input timing to the transmission device 101) becomes possible.

When stream data is transmitted from a plurality of transmission devices and a synchronization process is performed in a reception device, conventionally, the synchronization process has been realized by providing a reception buffer in a reception unit within the reception device corresponding to each transmission device and by setting a different reception buffer time for the synchronization process.

However, in the previous system, a parameter in an encoding process or in a QoS control process has not been changed in accordance with the reception buffer time and a difference between the reception buffer times of the reception units corresponding to the plurality of transmission devices.

Therefore, although there is no chance of increasing the transmission delay by adjusting the parameter in the encoding process or in the QoS control process, the transmission delay has not been adjusted, and therefore, a waste of the delay time is caused.

As described above, the transmission system 100 is capable of improving the image quality and picture quality without increasing the delay time by adjusting the parameter in the encoding process, the QoS control process, and the like in each data transmission in accordance with the difference in length of the transmission delay.

As shown in FIG. 1, the reception device 103 includes a transmission unit 111, a reference signal synchronization unit 112, a reception units 113-1 to 113-N, an integrated reception buffer time adjustment unit 114, and a synthesis unit 115.

The transmission unit 111 communicates with each transmission device 101, transmits information supplied from the reference signal synchronization unit 112 and the reception units 113-1 to 113-N, and receives information supplied from each transmission device 101 and supplies the information to the reference signal synchronization unit 112 and the reception units 113-1 to 113-N.

The reference signal synchronization unit 112 communicates with the transmission device 101 via the transmission unit 111 and synchronizes a reference signal with the transmission device 101. The reference signal is a signal used for synchronizing a process between the transmission device 101 and the reception device 103. A synchronized reference signal is supplied to the reception units 113-1 to 113-N.

That is, (the reference signal synchronization unit 112) of the reception device 103 serves as a master and all of the transmission devices 101 synchronize with the reception device 103, whereby all of the transmission devices 101 can synchronize with the reception device 103, accordingly.

The reception units 113-1 to 113-N respectively correspond to the transmission devices 101-1 to 101-N, receive an RTP packet supplied from the corresponding transmission devices 101, decode the RTP packet, and output video data. Hereinafter, in a case where it is not necessary to describe the reception units 113-1 to 113-N to distinguish from one another, the reception devices are simply referred to as the reception unit 113. That is, the reception units 113, the number thereof being equal to or larger than the number of the transmission devices 101, are prepared in advance. In other word, the reception device 103 is capable of receiving packets transmitted from the transmission devices 101, the number thereof being equal to or smaller than the number of the built-in reception units 113.

The integrated reception buffer time adjustment unit 114 adjusts a reception buffer time of each reception unit 113. The synthesis unit 115 synthesizes the video data output from each reception unit 113 and outputs synthesized video data from a video output terminal "video OUT" of the reception device 103. Timings of outputting the video data of the reception units 113 are in synchronization with each other. The synthesis unit 115 properly synchronizes these video data based on a user instruction and the like, for example, and outputs the data.

[A Configuration of a Transmission Device]

Figure 2:
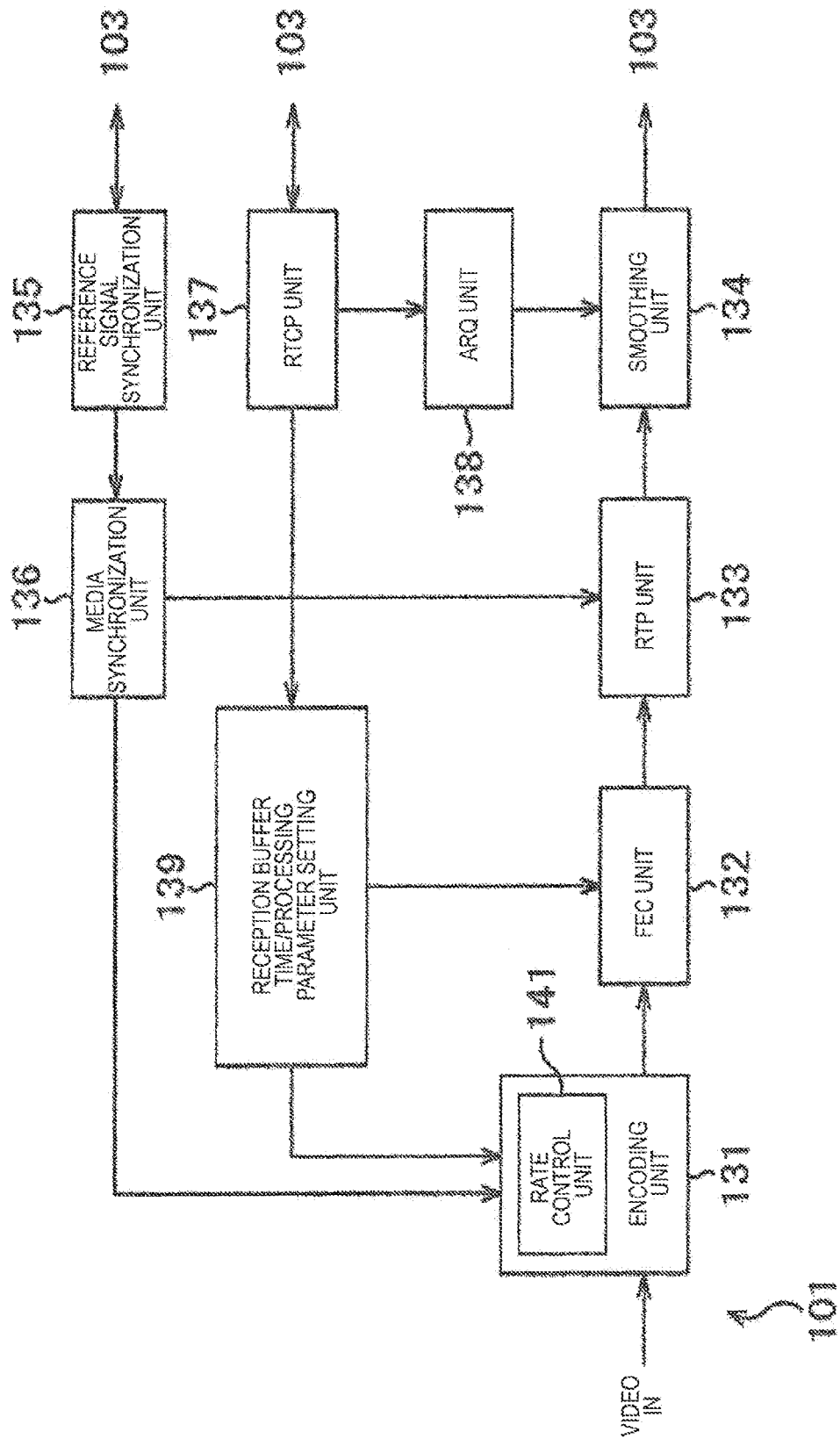
FIG. 2 is a block diagram showing a main configuration example of a transmission device.

As shown in FIG. 2, the transmission device 101 includes an encoding unit 131, a forward error correction (FEC) unit 132, a real-time transport protocol (RTP) unit 133, a smoothing unit 134, a reference signal synchronization unit 135, a media synchronization unit 136, an RTP control protocol (RTCP) unit 137, an auto repeat request (ARQ) unit 138, and a reception buffer time/processing parameter setting unit 139.

Video data (moving image data) input from a video input IF "video IN" via a video camera and the like is supplied to the encoding unit 131. The encoding unit 131 performs an encoding process of the moving image data with a predetermined encoding system. This encoding system employs any system but a system with a lower delay is desirable. An example of the encoding system will be described below.

The encoding unit 131 includes a rate control unit 141. The rate control unit 141 controls a bit rate of encoded data generated in the encoding unit 131. The encoding unit 131 performs RTP-packetization of the generated encoded data and supplies it to the FEC unit 132.

The FEC unit 132 generates a redundant packet, of the RTP packet supplied from the encoding unit 131. The RTP unit 133 performs the RTP-packetization of the redundant packet of the encoded data supplied from the FEC unit 132.

The smoothing unit 134 temporarily holds the RTP packet supplied from the RTP unit 133, smoothes it into a predetermined data rate and transmits it.

The reference signal synchronization unit 135 communicates with the reference signal synchronization unit 112 of the reception device 103 as a destination via the network 102 and synchronizes a reference signal clock. The reference signal synchronization unit 135 supplies a reference signal that has been synchronized with the reception device 103 to the media synchronization unit 136.

The media synchronization unit 136 supplies, to the encoding unit 131 (an RTP unit in the encoding unit 131) and the RTP unit 133, a time in synchronization with a sampling time of data input to the video IN, where a time supplied from the reference signal synchronization unit 135 is a reference. This supplied time is added to the RTP packet as an RTP time stamp.

The RTCP unit 137 performs transference/acceptance of an RTCP message with the reception device 103 as a destination and performs transmission/reception of a control message (QoS (quality of service) control message) for a QoS control process. The RTCP unit 137 supplies an acquired control message to the ARQ unit 138 and the reception buffer time/processing parameter setting unit 139.

The ARQ unit 138 controls the smoothing unit 134 according to a retransmission request message supplied from the RTCP unit 137 and retransmits a requested RTP packet.

The reception buffer time/processing parameter setting unit 139 performs parameter setting of the encoding unit 131 and the FEC unit 132 according to setting of various delay times and the like supplied from the RTCP unit 137.

[A Configuration Example of an Encoding Unit]

Figure 3:
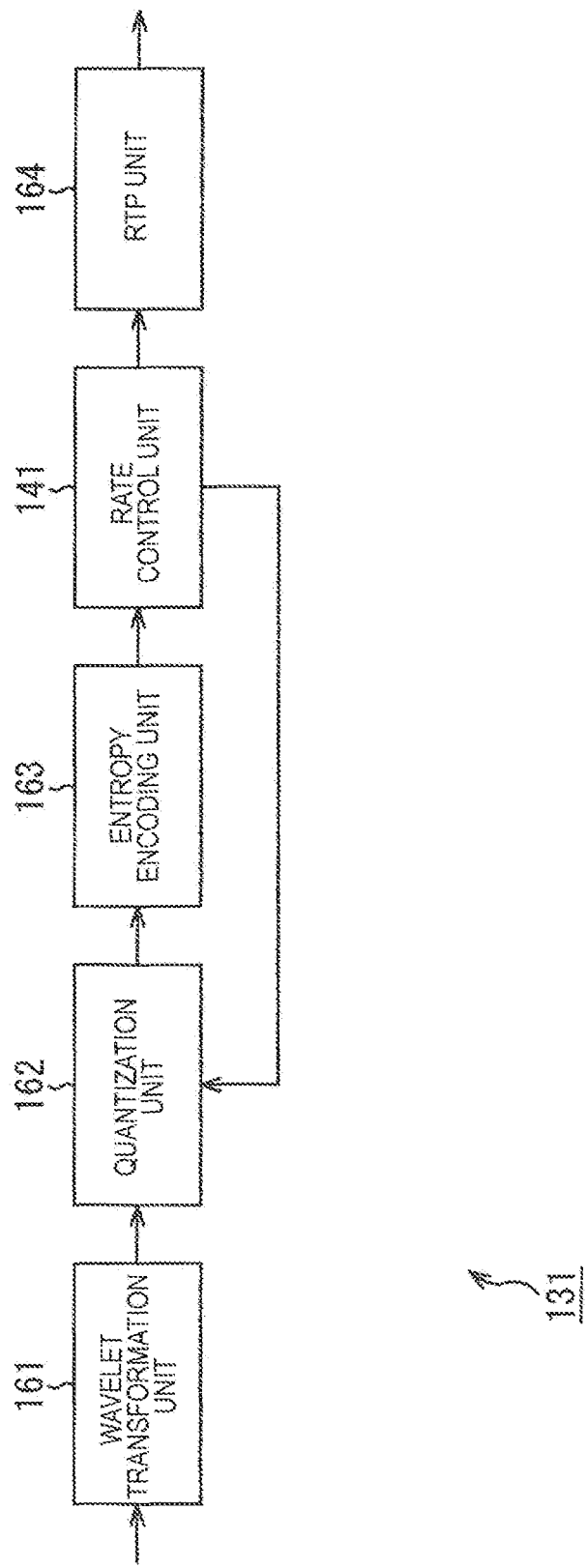
FIG. 3 is a block diagram showing a main configuration, of an encoding unit.

Next, an example of the encoding unit 131 of the transmission device 101 will be described. FIG. 3 is a block diagram showing a configuration example of the encoding unit 131 of the transmission device 101. The encoding unit 131 performs hierarchical encoding of the image data in which the image data is subjected to hierarchization in order of importance with respect to resolution and is encoded for each hierarchy. For example, the encoding unit 131 generates hierarchized data in order of importance with respect to spatial resolution. Also, for example, the encoding unit 131 generates the hierarchized data in order of importance with respect to resolution in a time direction. Further, for example, the encoding unit 131 generates the hierarchized data in order of importance with respect to a signal to noise ratio (SNR). The encoding unit 131 encodes hierarchized data generated in this way for each hierarchy.

As such hierarchical encoding, for example, there is a joint photographic experts group (JPEG) 2000 system in which each picture of moving image data is subjected to wavelet trans formation and entropy encoding. Although any hierarchical encoding method can be employed, hereinafter a case will be described in which the encoding unit 131 performs the wavelet transformation of the moving image data for each plurality of lines and performs the entropy encoding.

As shown in FIG. 3, the encoding unit 131 includes a wavelet transformation unit 161, a quantization unit 162, an entropy encoding unit 163, a rate control unit 141, and an RTP unit 164. The wavelet transformation unit 161 performs the wavelet transformation of each picture of a moving image for each plurality of lines.

The wavelet transformation is a process in which an analysis filter process for dividing input data into a low-band component and a high-band component is performed for both in a horizontal direction of a screen and in a vertical direction of the screen. That is, the input data is divided into four components (subbands) by the wavelet transformation process: a component low-band in the horizontal direction and low-band in the vertical direction (LL component), a component high-band in the horizontal direction and low-band in the vertical direction (HL component), a component low-band in the horizontal direction and high-band in the vertical direction (LH component), and a component high-band in the horizontal direction and high-band in the vertical direction (HH component).

The wavelet transformation unit 161 recursively repeats such a wavelet transformation process of the component low-band in the horizontal direction and low-band in the vertical direction (LL component) obtained by the analysis filter process for a predetermined number of times. That is, each picture of the moving image data is divided into a hierarchized plurality of subbands (frequency components) (hierarchized data is generated) by the wavelet transformation process. The entropy encoding unit 163 performs the encoding for each subband.

The image data of each picture of the moving image is input into the wavelet transformation unit 161 one line at a time in the order from the top to the bottom of the image. Also, the image data of each line is input one sample (one column) at a time in the order from the left to the right of the image.

Figure 4:
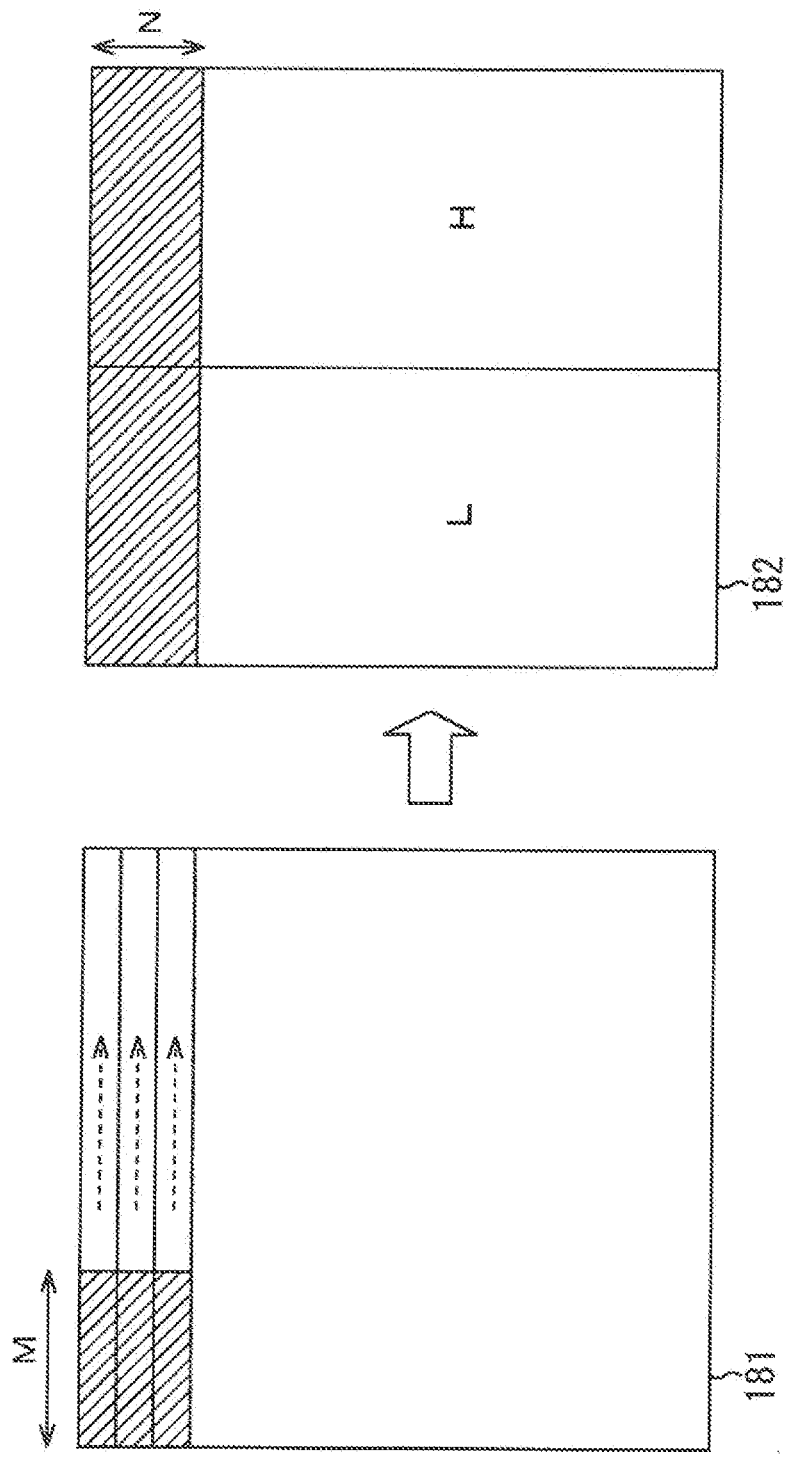
FIG. 4 is a diagram describing an outline of analysis filtering.

The wavelet transformation unit 161 executes analysis filtering in the horizontal direction of the image (horizontal analysis filtering) of the input image data every time the number of sample data with which the analysis filtering is executable is acquired (on reception of the data). For example, the wavelet transformation unit 161 performs the horizontal analysis filtering of image data 181 of a baseband shown in the left of FIG. 4 every time M column is input, and divides the image data 181 into a low-band component (L) and a high-band component (H) in the horizontal direction one line at a time. A horizontal analysis filter process result 182 shown in the right of FIG. 4 shows the low-band component (L) and the high-band component (H) in the horizontal direction of N lines divided by the wavelet transformation unit 161.

Next, the wavelet transformation unit 161 performs analysis filtering in the vertical direction (vertical analysis filtering) of each component of the horizontal analysis filter process result 182. The wavelet transformation unit 161 performs, when coefficients of vertical lines necessary for the vertical analysis filtering are generated by the horizontal analysis filtering, the vertical analysis filtering of the coefficients of the vertical lines necessary for the vertical analysis filtering for each column.

Figure 5:
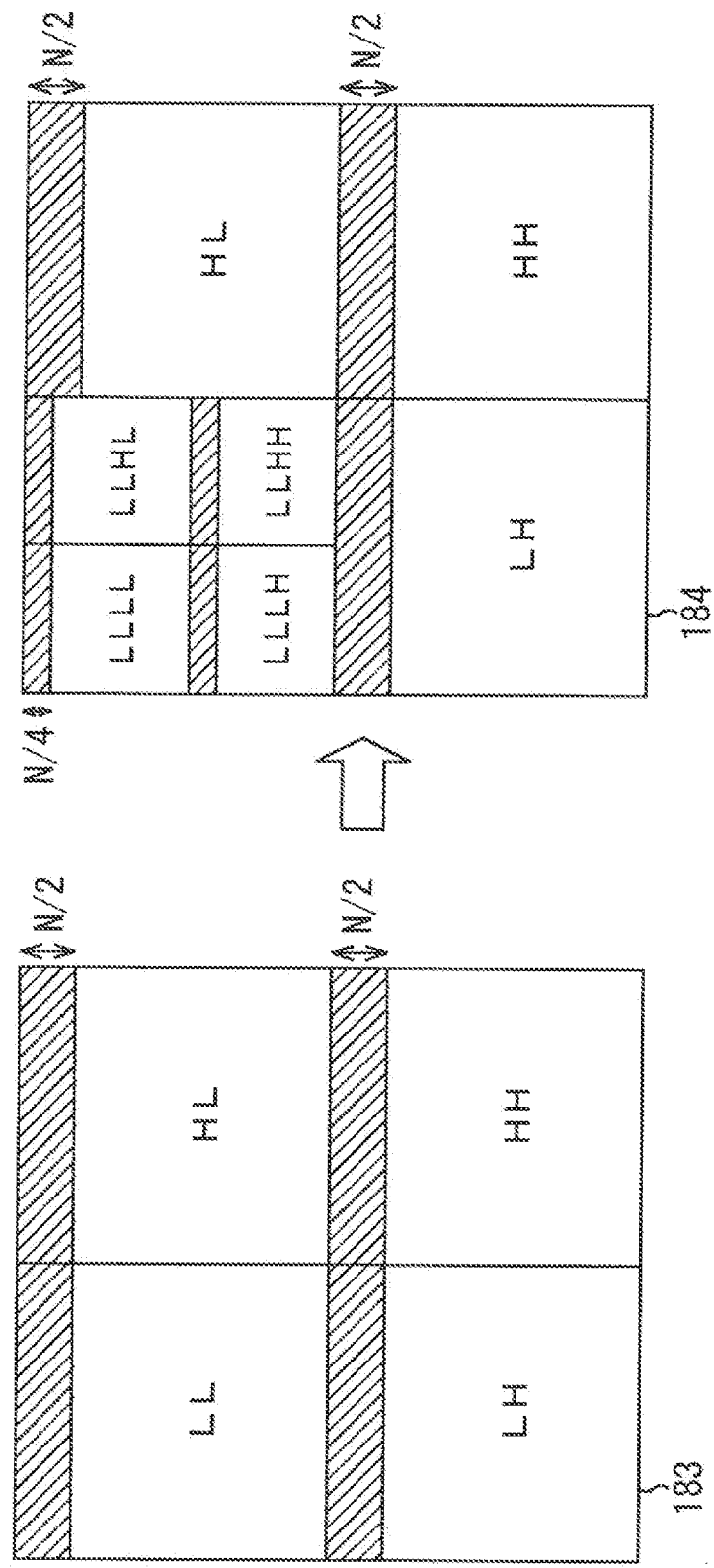
FIG. 5 is a diagram following FIG. 3 describing the outline of the analysis filtering.

As a result, the horizontal analysis filter process result 182 is, as shown in the left of FIG. 5, divided into wavelet transformation coefficients (hereinafter, referred to as coefficients) of four components (hierarchized data 183): a component low-band both in the horizontal direction and in the vertical direction (LL component), a component high-band in the horizontal direction and low-band in the vertical direction (HL component), a component low-band in the horizontal direction and high-band in the vertical direction (LH component), and a component high-band both in the horizontal direction and in the vertical direction (HH component).

Until coefficients of a predetermined hierarchy (division level) are obtained, the HL component, the LH component, and the HH component among the obtained analysis filtering result are output outside. The remaining LL component is subjected to the analysis filtering again by the wavelet transformation unit 161. That is, for example, the hierarchized data 183 shown in the left of FIG. 5 is transformed into hierarchized data 184 shown in the right of FIG. 5. In the hierarchized data 184, four components: an LLLL component, an LLHL component, an LLLH component, and an LLHH component are generated from the LL component.

Figure 6:
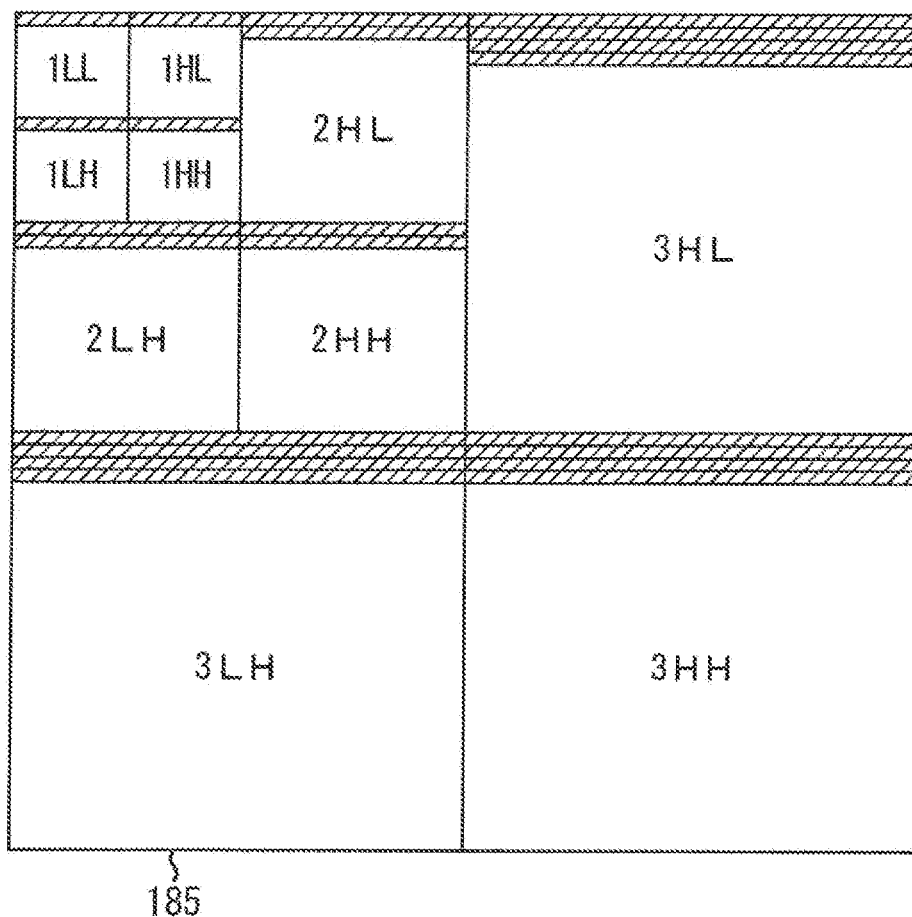
FIG. 6 is a diagram describing a line block.

The wavelet transformation unit 161 recursively performs such analysis filtering the predetermined number of times, and generates hierarchized data obtained by hierarchizing the moving image data into a desired division level. FIG. 6 is a diagram of an example of the hierarchized data hierarchized into a division level 3 (third hierarchy). In FIG. 6, hierarchized data 185 divided into the division level 3 is composed of subbands: a 3HL component, a 3LH component, and a 3HH component of a division level 1 (hierarchy number 3), a 2HL component, a 2LH component, and a 2HH component of a division level 2 (hierarchy number 2), and a 1LL component, a 1HL component, a 1LH component, and a 1HH component of a division level 3 (hierarchy number 1).

In the wavelet transformation, process, the number of lines to be generated becomes smaller by one half of the power of two every time the filtering process is repeated (every time the hierarchy goes into a lower level). The number of base band lines necessary for generating coefficients of one line of a final division level (hierarchy number 1) are determined according to the number of repetition of the filtering process (the number of hierarchies of the final division level). Typically, the number of hierarchies is determined in advance.

The image data of the baseband (image data of several lines) necessary for generating the coefficients of one line of the final division level or the coefficients of each hierarchy are collectively referred to as a line block (or a precinct).

A portion shown in a slant line in FIG. 6 represents coefficients that constitute one line block. As shown in FIG. 6, the line block is composed of the coefficients of one line of each component, of the hierarchy number 1, the coefficients of two lines of each component of the hierarchy number 2, and the coefficients of four lines of each component of the hierarchy number 3. Note, that the image data before the analysis filtering equivalent to the above, that is, the image data of eight lines in this example is also referred to as a line block (or a precinct).

Referring back to FIG. 3, the quantization unit 162 performs quantization by subtracting the coefficients of each component generated by the wavelet transformation unit 161 by a quantization step size, for example, to generate quantization coefficients. At this time, the quantization unit 162 can set the quantization step size for each line block (precinct). This line block includes the coefficients of all of the frequency components of a certain image region (in the case of FIG. 6, ten frequency components from 1LL to 3HH). Therefore, an advantage of multi-resolution analysis, which is a characteristic of the wavelet transformation, can be fully utilized by performing the quantization for each line block. Also, because only the number of line blocks is determined in all of the screens, a load of the quantization can be kept small.

Further, energy of an image signal is typically concentrated in a low-band component and there is a characteristic that deterioration of the low-band component is easily noticeable in human vision. Therefore, it is effective to perform weighing at the time of quantization in such a way that the quantization step size in the subbands of the low-band components results in a small value. By this weighing, a relatively large information amount is allocated to the low-band component, and therefore, overall subjective image quality is improved.

The entropy encoding unit 163 performs source-coding of the quantization coefficients generated in the quantization unit 162, generates compressed encoded data, and supplies it to the rate control unit 141. As the source-coding, for example, Huffman coding used in JPEG system or a moving picture experts group (MPEG) system or a higher precise arithmetic coding used in JPEG 2000 system can be used.

Here, which range of coefficients should be subjected to entropy encoding is very important element directly related to compression efficiency. For example, in JPEG system or MPEG system, 8×8 blocks are subjected to discrete cosine transform (DCT), and generated 64 DCT transformation coefficients are subjected to Huffman coding, whereby information is compressed. That is, the 64 DCT transformation coefficients are the range of the entropy encoding.

Unlike the DCT transformation in relation to the 8×8 blocks, the wavelet transformation unit 161 performs the wavelet transformation by line. Therefore, the entropy encoding unit 163 performs source-coding independently for each frequency band (subband), and for each P line in each frequency band.

In P, one line is the minimum line. The smaller number of lines needs less reference information, and therefore, a memory capacity can be reduced. On the other hand, if the number of lines is large, the information amount also increases. Therefore, the encoding efficiency can be improved. However, P has a value exceeding the number of lines of a line block in each frequency band, it becomes necessary to have a line of the next line block. Therefore, it is necessary to wait until quantization coefficient data of this line block is generated by the wavelet transformation and the quantization, and therefore, this waiting time becomes a delay time.

Therefore, to realize a low delay, it is necessary that P is equal to or smaller than the number of lines of the line block. For example, in the example of FIG. 6, for the frequency bands of 1LL, 1HL, 1LH, and 1HH, P=1 because the number of lines of the line block=1 line. Also, for the subbands of 2HL, 2LH, and 2HH, P=1 or 2 because the number of lines of the line block=2 lines.

The rate control unit 141 finally performs control of adjusting a rate to a target bit rate or compression rate, and supplies encoded data after the rate control to the RTP unit 164. For example, the rate control unit 141 compares a bit rate (compression rate) of encoded data output from the entropy encoding unit 163 with a target value, and transmits a control signal to the quantization unit 162 so as to decrease the quantization step size in order to increase the bit rate and to increase the quantization step size in order to decrease the bit rate.

The RTP unit 164 performs RTP-packetization of the encoded data supplied from the rate control unit 141 and supplies it to the EEC unit 132.

[A Configuration of a Reception Device]

Figure 7:
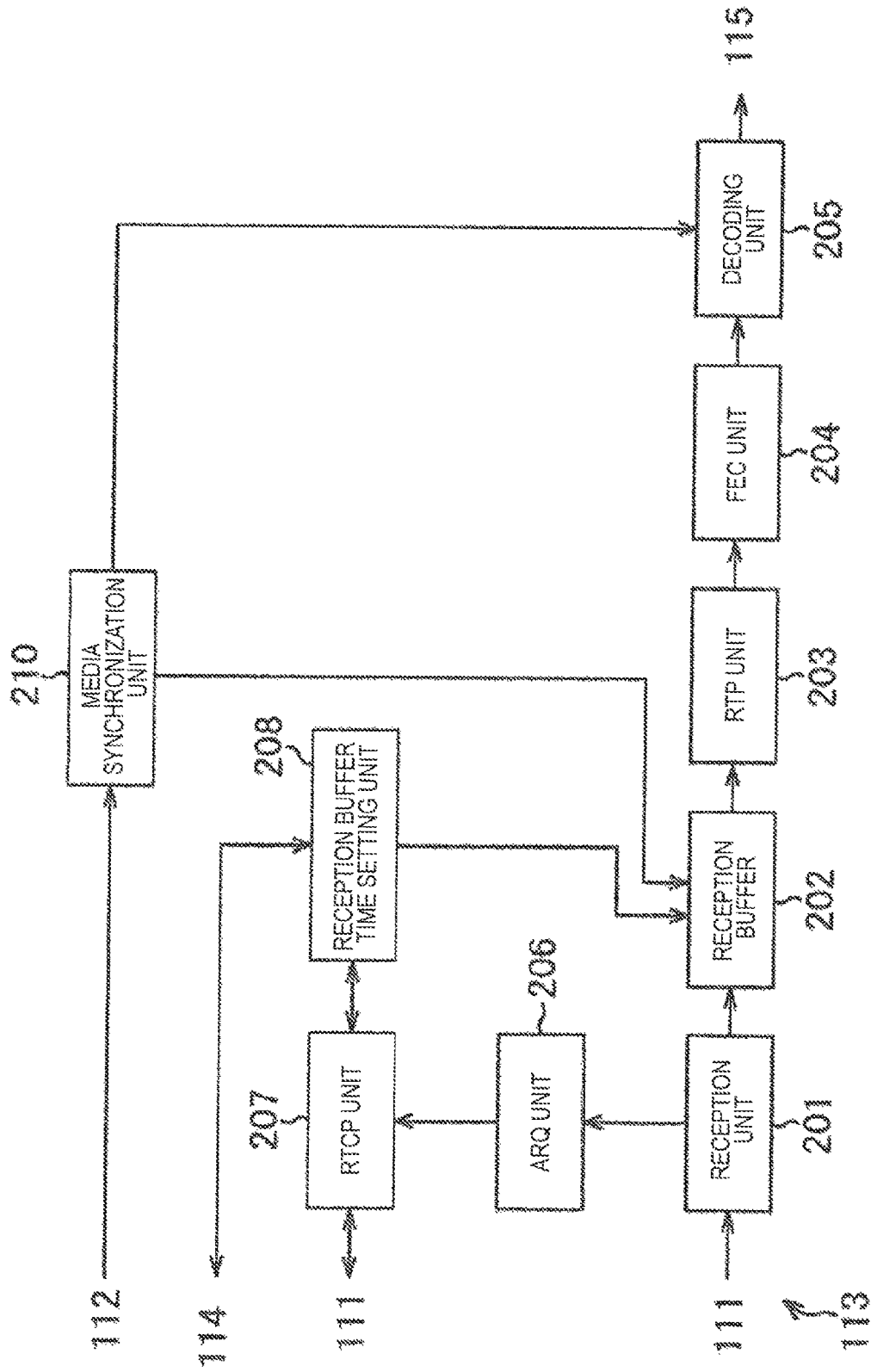
FIG. 7 is a block diagram showing a main configuration example of a reception unit.

Next, a configuration example of an interior of each reception unit 113 of the reception device 103 in FIG. 1 will be described. FIG. 7 is a block diagram showing a main configuration example of the reception unit 113. As shown in FIG. 7, the reception unit 113 includes a reception unit 201, a reception buffer 202, an RTP unit 203, an FEC unit 204, a decoding unit 205, an ARQ unit 206, an RTCP unit 207, a reception buffer time setting unit 208, and a media synchronization unit 210.

The reception unit 201 receives an RTP packet transmitted from the transmission device 101 corresponding thereto via the network 102 and supplied via the transmission unit 111, and supplies the RTP packet to the reception buffer 202. The reception buffer 202 temporarily holds the RTP packet supplied from the reception unit 201 in order to synchronize with data transmission by other reception units 113, for example, and then supplies the RTP packet to the RTP unit 203 at a time determined based on information from the reception buffer time setting unit 208 and the media synchronization unit 210.

The RTP unit 203 reconfigures the RTP packet to generate FEC redundant encoded data, which is encoded data including a redundant packet, and supplies it to the FEC 204. The FEC unit 204 detects a loss of the packet and recovers lost packet data by a redundant-encoding decoding process as needed. The FEC unit 204 supplies processed encoded data to the decoding unit 205.

The decoding unit 205 decodes the encoded data by a decoding system corresponding to a system of the encoding process in the encoding unit 131. Decoded video data (moving image data) is output from a video output. IF (video OUT) of the reception device 103 to a picture display device such as a display (not shown), for example.

The ARQ unit 206 detects a lost packet (a packet that could not be received) in the reception unit 201, and controls the RTCP unit 207 to transmit a retransmission request message to the ARQ unit 138 of the transmission device 101 when detecting the lost packet. The RTCP unit 207 supplies the retransmission request message requested by the ARQ unit 206 and various types of setting information supplied from the reception buffer time setting unit 208 as an RTCP message to the RTCP unit 137 of the transmission device 101.

The reception buffer time setting unit 208 sets and adjusts a reception buffer time based on control and the like by the integrated reception buffer time adjustment unit 114.

The media synchronization unit 210 controls an output timing of the RTF packet from the reception buffer 202, a start timing of a decoding process in the decoding unit 205, and the like based on the reference signal synchronized in each reception unit 113 (and each transmission device 101) by the reference signal synchronization unit 112.

[A Configuration Example of a Decoding Unit]

Figure 8:
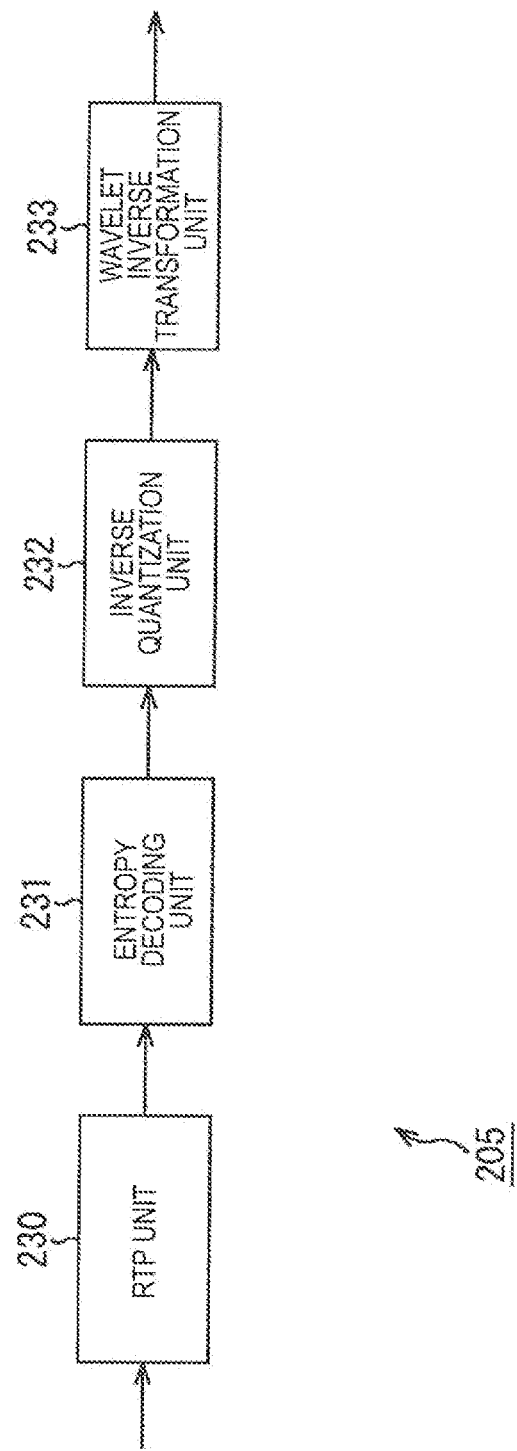
FIG. 8 is a block diagram showing a main configuration example of a decoding unit.

Next, an example of the decoding unit 205 corresponding to the above-described example of the encoding unit 131 will be described. FIG. 8 is a block diagram showing a configuration example of the decoding unit 205 of the reception unit 113. In FIG. 8, the decoding unit 205 includes an RTF unit 230, an entropy decoding unit 231, an inverse quantization unit 232, and a wavelet inverse transformation unit 233.

The RTF unit 230 transforms the RTP packet supplied from the EEC unit 204 into encoded data and supplies it to the entropy decoding unit 231. The entropy decoding unit 231 decodes the encoded data by a method corresponding to the encoding method in the entropy encoding unit 163 and generates quantization coefficient data. For example, Huffman decoding, high efficient arithmetic decoding, and the like can be used. Note that, in a case where decoding has been performed for each P line in the entropy encoding unit 163, the entropy decoding unit 231 independently decodes each subband and performs decoding for each P line within each subband.

The inverse quantization unit 232 performs inverse quantization by multiplying the quantization coefficient data and the quantization step size to generate coefficient data. This quantization step size is, typically, specified in a header of the encoded data supplied from the transmission device 101. Note that, in a case where the quantization step size is set for each line block in the quantization unit 162, an inverse quantization step size is similarly set for each line block in the inverse quantization unit 232, and inverse quantization is performed.

The wavelet inverse transformation unit 233 performs an inverse process of the wavelet transformation unit 161. That is, the wavelet inverse transformation unit 233 performs a filtering process (synthesis filtering process) that synthesizes a low-band component and a high-band component both in the horizontal direction and in the vertical direction with respect to the coefficient data divided into a plurality of frequency bands by the wavelet trans formation unit 161. The wavelet inverse transformation unit 233 restores video data of a baseband by such a wavelet inverse transformation process, and outputs it from the video OUT to an outside of the reception device 103.

Obviously, the above-described encoding unit 131 and the decoding unit 205 are an example, and other encoding/decoding system may be used.

[A Transmission Process]

Next, each process performed in the transmission system 100 (FIG. 1) will be described. First, a transmission process for transmitting video data from each transmission device 101 to the reception device 103 via the network 102 will be described.

The transmission device 101 inputs video data input from the video input IF "video IN" via a video camera and the like to the encoding unit 131 (FIG. 2) that performs a compression encoding process of moving image data and performs encoding.

Encoded data generated by this encoding is subjected to an RTP packetization process by the RTP unit 164 (FIG. 3) within the encoding unit 131, and is supplied to the FEC unit 132 (FIG. 2) as an RTP packet. The FEC unit 132 performs an FEC redundant encoding process of the supplied RTP packet to generate a redundant packet. The FEC unit 132 supplies the generated redundant packet to the RTP unit 133 with an original RTP packet.

The RTP unit 133 performs RTP-packetization of the redundant packet supplied from the FEC unit 132. The smoothing unit 134 smoothes a rate of the RTP packet supplied from the RTP unit 133, and transmits it to the network 102. An RTP time stamp for synchronization specified by the media synchronization unit 136 is set in each RTP packet in the RTP unit 164 (FIG. 3) or in the RTP unit 133 (FIG. 2).

In FIG. 1, the reception device 103 receives the RTP packets transmitted from a plurality of the transmission devices 101 once by the transmission unit 111 and allocates the RTP packet, into the reception unit 113 corresponding to each transmission device 101. For example, the RTP packet transmitted from the transmission device 101-K (K=1, 2, . . . , N) is allocated to the reception unit 113-K.

The reception unit 113 supplies the RTP packet to the reception buffer 202 via the reception unit 201 (FIG. 7) and causes the reception unit 201 to hold it. At this time, when a lost packet is detected, the fact of the detection is notified to the ARQ unit 206. Upon receiving the notification, the ARQ unit 206 performs a retransmission request process.

The reception buffer 202 determines a reception buffer output time, which is a time at which the reception buffer 202 outputs the RTP packet, and outputs each RTP packet to the RTP unit 203 at that time, the reception buffer output time being determined from the reception buffer time determined by the reception buffer time setting unit 208, the time information notified from the media synchronization unit 210, and the RTP time stamp value set in each RTP packet.

The RTP unit 203 reconfigures the RTP packet, and supplies obtained FEC redundant encoded data to the FEC unit 204. When a lost packet, which is a packet lost in data transmission, is detected, the FEC unit 204 recovers lost packet data by a redundant-encoding decoding process. The FEC unit 204 outputs a processed RTP packet to the decoding unit 205. The decoding unit 205 extracts encoded data from the RTP packet, and performs a decoding process of the encoded data to generate video data of a baseband. Decoded video data is supplied to the synthesis unit 115 (FIG. 1).

The synthesis unit 115 synthesizes video data images from a plurality of the reception units 113, and outputs it from the video output IF "video OUT" to a picture display device such as a display, for example.

[A Reference Signal Synchronization Process]

Next, a reference signal synchronization process for synchronizing a reference signal will be described. The reference signal synchronization unit 112 (FIG. 1) synchronizes a reference signal clock between the transmission device 101 and the reception device 103 using an IEEE 1588 precision time protocol (PTP). Note that, as a frequency of the reference signal clock, a pixel sampling frequency of an input video image may be used, for example. In this case, synchronization with a video output device input from "video IN" can also be performed.

Note that it may be configured such that the reception device 103 is not provided with the reference signal synchronization unit 112 and does not perform the synchronization between the transmission device 101 and the reception device 103.

As shown in FIG. 1, in a case where a plurality of the transmission devices 101 exists, the reception device 103 serves as a master and causes all of the transmission devices 101 to synchronize with the reception device 103. In this case, the reception device 103 synchronizes with all of the transmission devices 101, whereby the synchronization between all of the transmission devices 101 and the reception device 103 can be performed, accordingly.

[A Media Synchronization Process]

The media synchronization unit 136 (FIG. 2) of the transmission device 101 transforms a time synchronized with a sampling time of data input from "video IN" into a frequency of an RTP time stamp based on the time notified from the reference signal synchronization unit 135, and adds it to each RTP packet as an RTP time stamp in the RTP unit 164 (FIG. 3) within the encoding unit 131 and the RTP unit 133 (FIG. 2).

The media synchronization unit 210 (FIG. 7) of the reception device 103 holds the reference clock time information notified from the reference signal synchronization unit 112 (FIG. 1) as a system time converted into an RTP time stamp frequency. The reception buffer 202 (FIG. 7) of the reception device 103 determines a reception buffer output time of each RTP packet when an RTP packet is recorded, the reception buffer output time being determined from the RTP time stamp value of the RTP packet, the reception buffer time notified from the reception buffer time setting unit 208, and the RTP time stamp frequency time supplied from the media synchronization unit 210. The reception buffer 202 supplies the held RTP packet to the RTP unit 203 at the reception buffer output time.

The reception buffer output time of the RTP packet is set as follows. For example, assume that a head packet of encoded data is output from a reception buffer at a time after a reception buffer time TSTIME_BUF elapses from a received time, and a subsequent packet is output in synchronization with a time calculated from a differential value between an RTP time stamp value of the head packet and an RTP time stamp value of the subsequent packet.

A reception buffer output time TSSYS_BO_n of an RTP packet n is, for example, calculated with the following formula (1). Here, the RTP time stamp value of the head packet of encoded data is TSPKT_init, the reception time (system time conversion: the frequency is an RTP time stamp frequency) is TSSYS_init, and the RTP time stamp value of the RTP packet n is TSPKT_n.

$$TSSYS\_BO\_n = (TSPKT\_n - SPKT\_init) + TSSYS\_init + TSTIME\_BUF \quad (1)$$

[A Codec Process]

The encoding unit 131 is, for example, a hierarchical encoding system proposed in Patent Document 1, in which wavelet transformation is performed for each several lines of each picture of a moving image as one compression encoding block, and using an encoding system having a different range of related input data for each hierarchy.

The encoding unit 131 (FIG. 2) of the transmission device 101 performs an encoding process, and the decoding unit 205 (FIG. 7) in the reception device 103 performs a decoding process.

The encoding unit 131 (FIG. 2) of the transmission device 101 includes the rate control unit 141 as an internal processing unit. The rate control unit 141 performs, for example, a rate control that controls an encode rate not to overflow, where a bucket size is an encoder assumed buffer size B (byte) and a bucket rate R (bps) is an encode rate in a token bucket behavior specified in ITU-T Y.1221. A buffer time required in the reception device 103 when the rate is subjected to smoothing-transmission is defined as a variable compression encoding delay time.

The variable compression encoding delay time Bt_codec (sec) is, for example, expressed by the following formula (2).

$$Bt\_codec = B \times 8 / R \quad (2)$$

The encoder assumed buffer size B is determined in accordance with the image quality request specified by the user and the like. In a case of compression encoding by VBR system, by having a large encoder assumed buffer size B, a larger amount of data can be used for an image portion with high complexity, whereby the image quality can be improved. That is, when the image quality request is high, by making the encoder assumed buffer size B large, it can be responded to the high request.

However, when the encoder assumed buffer size B is made large, a variable compression encoding delay request time Bt_codec_req (sec) becomes large, and therefore, there is a concern of increasing a delay.

[An RTCP Process]

Next, an RTCP process of a QoS control process performed between each transmission device 101 and the reception device 103 will be described. The RTCP unit 137 (FIG. 2) and the RTCP unit 207 (FIG. 7) perform transmission/reception of an RTCP message between the transmission device 101 and the reception device 103 using RTCP specified in IETF RFC 3550, and perform information collection such as a packet loss rate, a reciprocating transmission delay (RTT), and a network jitter, and the transmission/reception of a control message for the QoS control process. The QoS control message includes, for example, a retransmission request message in an ARQ process, and the like.

[An FEC Process]

Next, an FEC process of the QoS control process will be described. The FEC unit 132 (FIG. 2) performs FEC redundant encoding of an RTP packet of encoded data supplied from the encoding unit 131 as a unit. For example, the FEC unit 132 performs redundant encoding using an erasure error correction code such as a Reed-Solomon code.

The redundancy in the FEC redundant encoding is, for example, determined by the transmission quality request specified by the user and the like. The redundancy is specified in the form of (the number of original data packets and the number of redundant packets). The user also specifies an assumed packet loss rate p of a network.

Hereinafter, a pair of (the number of original data packets and the number of redundant packets) is one redundant code unit (so-called "FEC block"). For example, when it is specified that (the number of original data packets and the number of redundant packets)=(10, 5), the FEC unit 132 of the transmission device 101 generates five redundant packets with respect to ten original data packets. That is, a total of 15 packets are transmitted in this FEC block.

In this case, if the FEC unit 204 (FIG. 7) of the reception device 103 receives any ten packets in the FEC block packet, the original data can be decoded by an FEC decoding process. For example, where the packet loss rate specified by the user is p, the number of packets in the FEC block is n, the number of original data packets is k, the number of redundant packets is n-k, and a target FEC block loss rate specified as the transmission quality request by the user is Pt, the target FEC block loss rate Pt is expressed by the following formula (3).

[Formula 1]

$$P_t \geq 1 - \sum_{j=0}^{n-k} {}_nC_j p^j (1-p)^{n-j} \quad (n > k) \tag{3}$$

The number of original data packets k and the number of redundant packets n-k are determined so as to satisfy the formula (3).

In the reception device 103 (FEC unit 204 (FIG. 7)) in FIG. 1, it is necessary to set a reception buffer time to be equal to or longer than the time from when a head packet of the FEC block is arrived at the reception device 103 till when a tailing packet is arrived (so-called "redundant encoding block reception waiting time") in order to recover a lost packet by the FEC redundant decoding process.

The redundant encoding block reception waiting time corresponding to the FEC block set according to the transmission quality request, specified by the user and the like is referred to as "redundant encoding block reception waiting request time".

[An ARQ Process]

In an ARQ process in the reception device 103 of FIG. 1, the reception unit 201 (FIG. 7) detects a lost packet using a sequence number of the RTP packet, the ARQ unit 206 generates a retransmission request message of the lost packet, and the RTCP unit 207 transmits the retransmission request message to the transmission device 101 to perform the retransmission request.

Note that, when the ARQ unit 206 of the reception device 103 performs the retransmission request of the packet lost, and the reception unit 201 does not receive a retransmission packet, after a reciprocating transmission time (ARQ retransmission packet waiting time) elapses, the retransmission request may again be performed. Further, until it is determined that arrival of the retransmission packet misses the reception buffer time of the packet, the ARQ unit 206 may repeat, such a retransmission request.

In the ARQ process in the transmission device 101, when the RTCP unit 137 (FIG. 2) receives the retransmission request message, the ARQ unit 138 generates an RTP packet (retransmission packet) to be retransmitted, supplies the retransmission packet to the smoothing unit 134, and causes the smoothing unit 134 to retransmit the retransmission packet.

The recovery performance in the ARQ process depends on an ARQ retransmission packet waiting time, which is a time for waiting a retransmission packet by a request of the ARQ unit 206 (FIG. 7) in the reception device 103. The longer the ARQ retransmission packet waiting time is, the further improved the recovery performance is. However, it is necessary to have the reception buffer time equal to or longer than the ARQ retransmission packet waiting request time. Therefore, there is a concern of increasing a delay.

This "ARQ retransmission packet waiting request time" is determined by the transmission quality request specified by the user and the like.

[A Network Jitter Handling Process]

The reception buffer 202 (FIG. 7) of the reception device 103 is also provided with a network jitter handling process mechanism. The reception buffer 202 sets a time equal to or longer than a "network jitter handling buffer request time" determined by the transmission quality request specified by the user and the like as the reception buffer time. In this way, the synchronization process of a packet subjected to a jitter equal to or shorter than the "network jitter handling buffer request time" becomes possible.

[A Whole Data Transmission System]

Next, an example of a whole flow of a data transmission process executed in the transmission system 100 will be described with reference to a flowchart in FIG. 9.

Before starting data transmission, the RTCP unit 207 of each reception unit 113 communicates with the transmission device 101 corresponding thereto, and measures a network condition at step S121. Meanwhile, the RTCP unit 137 of each transmission device 101 measures the network condition at step S101.

That is, a condition in relation to communication of the network 102 (network condition information) is measured by transference/acceptance of a packet firstly performed between the RTCP unit 137 and the RTCP unit 207.

Before starting transmission of encoded data, the RTCP unit 137 transmits dummy data used for network condition preliminary measurement. The dummy data is transmitted to the RTCP unit 207 via the network 102. The RTCP unit 207 receives the dummy data, and performs measurement (preliminary measurement) from information at the time of transmission specified in the packet and a condition at the time of reception.

Upon obtaining network condition information, the reception buffer time setting unit 208 performs a reception buffer time determination process, performs setting in the reception unit 113, and performs notification in relation to the reception buffer time to the transmission device 101 at step S122.

The reception buffer time/processing parameter setting unit 139 of the transmission device 101 performs a reception buffer time/processing parameter setting process, and sets various parameters upon receiving the notification from the reception device 103 at step S102.

The transmission device 101 and the reception device 103 perform, a data transmission process in cooperation with each other at respective steps S103 and S123 in which an RTP packet of video data is transmitted from the transmission device 101 to the reception device 103.

[A Reception Buffer Time Determination Process]

Next, an example of a flow of the reception buffer time determination process executed at step S122 of FIG. 9 will be described with reference to FIG. 10.

In the reception buffer time determination process, adjustment of the reception buffer time is performed so as to synchronize all of the reception units 113. The synchronization here means that, when a packet including data captured at the same time is input to all of the reception units 113, the packet is output from the reception buffer 202 at the same timing.

Figure 11:
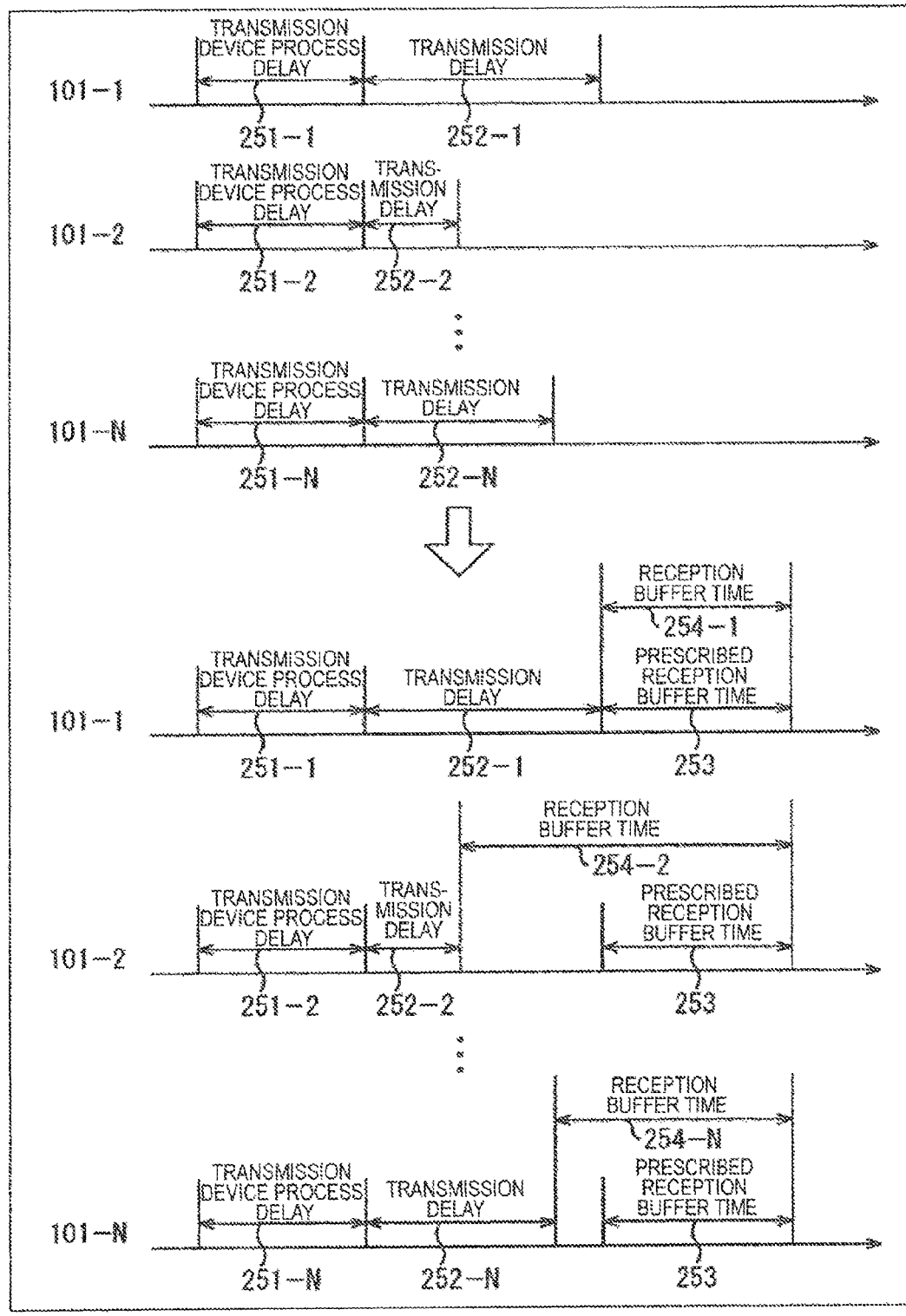
FIG. 11 is a diagram showing an example of a look of setting of a reception buffer time.

To perform, a synchronization output, as shown in FIG. 11, it is necessary to perform adjustment considering a difference between transmission delay times (a difference in length between the transmission delays).

The integrated reception buffer time adjustment unit 114 obtains a maximum transmission delay time that is the longest delay time from among transmission delays of data transmission performed by the reception units 113 at step S141. This maximum transmission delay time is obtained with the following formula (4).

$$\text{Maximum transmission delay time} = \text{MAX}(\text{a transmission delay time 1, a transmission delay time 2, ..., and a transmission delay time N}) \quad (4)$$

Note that, in formula (4), MAX ( ) is a function for calculating a maximum value.

The integrated reception buffer time adjustment unit 114 selects a reception unit to be processed from among unprocessed reception units 113 to be used for the data transmission at step S142.

The reception buffer time setting unit 208 of the selected reception unit 113 to be processed calculates the reception buffer time using the maximum transmission delay time, the transmission delay time of the data transmission by this reception unit 113, and a prescribed reception buffer time at step S143.

The prescribed reception buffer time is a minimum reception waiting time required in the encoding process and the QoS control process, and is determined in advance. The reception buffer time is a buffer time for synchronization by absorbing a difference between the transmission delays of the data transmission from the transmission devices 101. The reception buffer time includes the prescribed, reception buffer time. That is, the reception buffer time is obtained by adjusting the prescribed reception buffer time (typically, by making the prescribed reception buffer time longer) in accordance with the length of the transmission delay of each data transmission.

The reception buffer time can be calculated with the following formula (5).

$$\text{Reception buffer time } K = \text{Maximum transmission delay time} - \text{Transmission delay time } K + \text{Prescribed reception buffer time} \quad (5)$$

Note that K=1, . . . , N

For example, assume that a transmission device process delay 251, which is a delay time by a process in the transmission device 101, and a transmission delay 252, which is a delay time by transmission via the network 102, in data transmission of each transmission device 101, are like the example shown in the upper drawing of FIG. 11.

In this example, a transmission delay 252-1 of a transmission device 101-1 is the longest. Therefore, this transmission delay 252-1 serves as the maximum transmission delay time.

As shown in the lower drawing of FIG. 11, a reception buffer time 254-1 of the data transmission of the transmission device 101-1 has an equal length to a prescribed reception buffer time 253. Meanwhile, a difference in length of the transmission delays is added to the prescribed reception buffer time 253 in the reception buffer time 254 of the data transmission of other transmission device 101.

Therefore, the sum of the transmission device processed delay, the transmission delay, and the reception buffer time is common in each data transmission. Therefore, the delay time in the whole data transmission is not increased.

As described above, by setting the reception buffer time as longer as possible and adjusting the setting of a parameter of the encoding process, the QoS control process, and the like in accordance with the length of the reception buffer time, the transmission device 101 and the reception device 103 are capable of performing the parameter setting so as to improve the image quality and the transmission quality without increasing the delay time of the whole data transmission.

Referring back to FIG. 10, when the reception buffer time is calculated as described above, the reception buffer time setting unit 208 sets various delay times and waiting times such as a variable compression encoding delay time, a redundant encoding block reception waiting time, an ARQ retransmission packet waiting time, and a network jitter handling buffer time from the reception buffer time at step S144.

Setting values in each process in a certain transmission device 101-K (K=1, . . . , N) and a reception unit 113-K corresponding thereto: a "variable compression encoding delay time K", a "redundant encoding block reception waiting time K", an "ARQ retransmission packet waiting time K", and a "network jitter handling buffer time K" are calculated from a "reception buffer time K" are calculated with the following formula (6).

$$\text{Variable compression encoding delay time } K = \quad (6)$$
$$\text{Redundant encoding block reception waiting time } K =$$
$$\text{ARQ retransmission packet waiting time } K = \text{Network jitter}$$
$$\text{handling buffer time } K = \text{Reception buffer time } K$$

Note that $K = 1, \ldots, N$

As described above, when each time is set, the reception buffer time setting unit 208 sets the "ARQ retransmission packet waiting time" to the ARQ unit 206 at step S145, and allows the ARQ unit 206 to use it to determine whether a retransmission request is performed.

Also, the reception buffer time setting unit 208 sets the "network jitter handling buffer time" to the reception buffer 202 at step S146.

At step S147, the reception buffer time setting unit 208 notifies the "variable compression encoding delay time" and a "redundant encoding block waiting time" to the transmission device 101 corresponding to the reception unit 113 to be processed as an RTCP message via the RTCP unit 207, for example.

At step S148, the integrated reception buffer time adjustment unit 114 determines whether all of the reception units 113 have been processed. When it is determined that an unprocessed reception unit 113 exists among the reception units 113 to be used for data transmission, the integrated reception buffer time adjustment unit 114 returns the process to step S142, selects a new reception unit to be processed, and repeats the subsequent process for the new reception unit to be processed.

Figure 9:
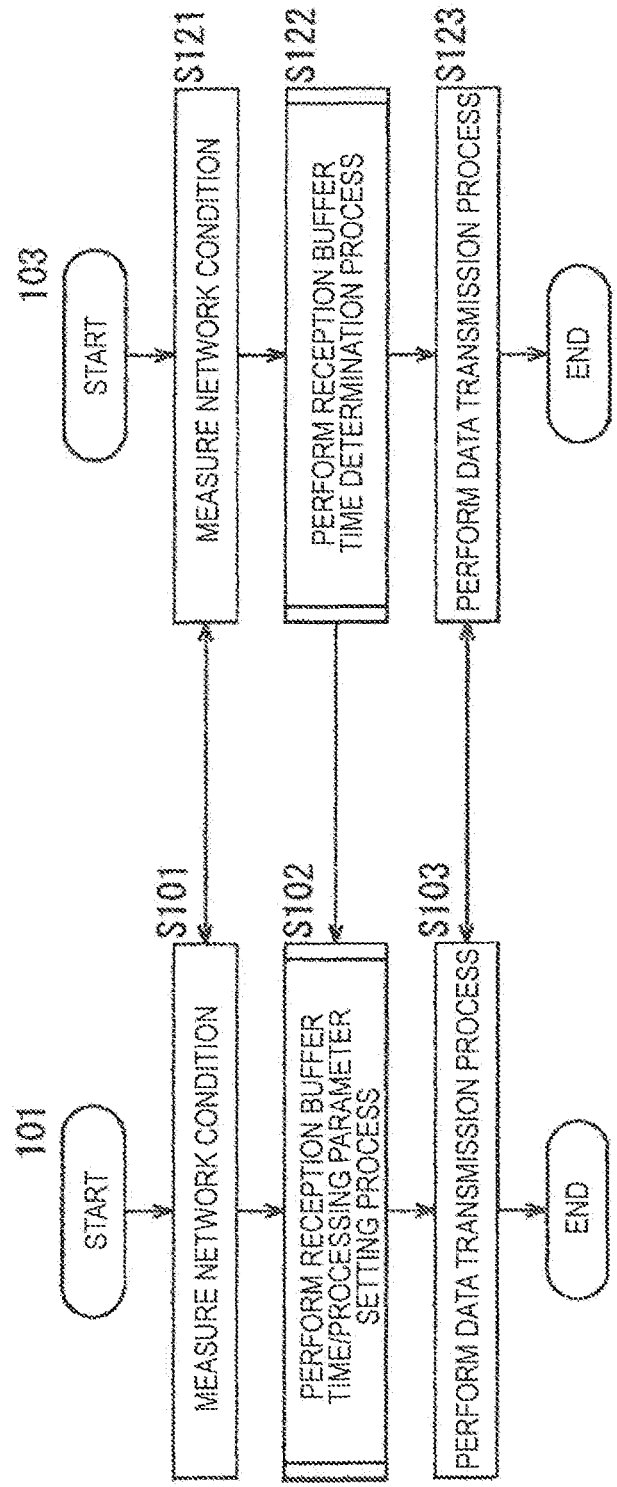
FIG. 9 is a flowchart describing an example of a flow of a whole data transmission process.

Also, at step S148, when it is determined that all of the reception units 113 have been processed, the reception buffer time determination process is terminated and the process is returned to step S122 of FIG. 9, and the subsequent process is performed.

[A Reception Buffer Time/Processing Parameter Setting Process]

Figure 12:
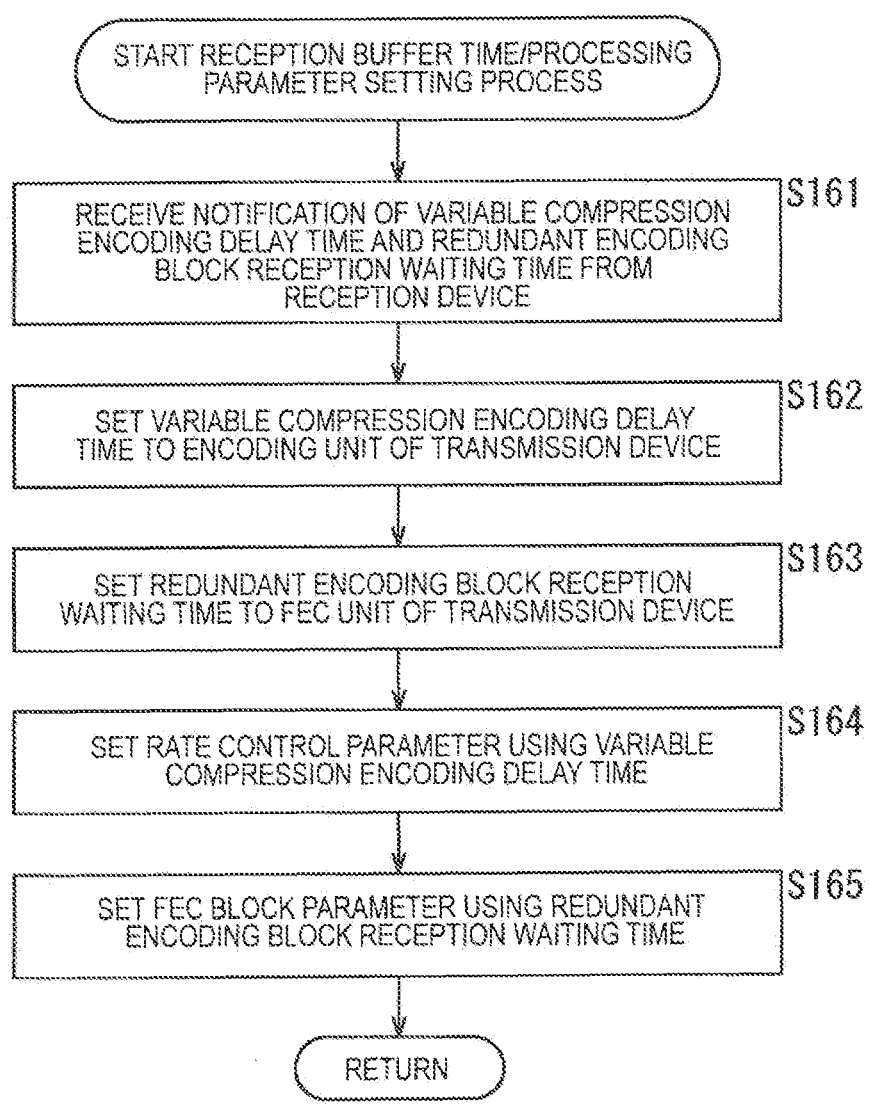
FIG. 12 is a flowchart describing an example of a flow of a reception buffer time/processing parameter setting process.

Next, the reception buffer time/processing parameter setting process executed at step S102 of FIG. 9 will be described with reference to a flowchart of FIG. 12.

When the reception buffer time/processing parameter setting process is initiated, the reception buffer time/processing parameter setting unit 139 acquires the "variable compression encoding delay time" and the "redundant encoding block, waiting time" included in the RTCP message supplied from the reception device 103 via the RTCP unit 137 at step S161.

At step S162, the reception buffer time/processing parameter setting unit 139 sets the "variable compression encoding delay time" to the encoding unit 131. At step 3163, the reception buffer time/processing parameter setting unit 139 sets the "redundant encoding block waiting time" to the FEC unit 132.

The rate control unit 141 sets a rate control parameter using the supplied "variable compression encoding delay time" at step S164. For example, the rate control unit 141 sets the encoder assumed buffer size B (byte) so as to satisfy the following formula (7). Note that, in the formula (7), "Bt_codec (sec)" represents the variable compression encoding delay time. Also, "R (bps)" represents a packet rate.

$$Bt\_codec = B \times 8 / R \quad (7)$$

The FEC unit 132 sets an FEC block parameter using the "redundant encoding block reception waiting time" at step S165. The "redundant encoding block waiting time" is a maximum value of a time it takes to perform smoothing-transmission of all of the packets included in the FEC block. The FEC unit 132 adjusts the number of original data packets of each FEC block such that this time is equal to or shorter than the "redundant encoding block waiting time". Further, the FEC unit 132 sets, for example, the number of redundant packets n-k so as to satisfy the above-described formula (3).

When the process at step S165 ends, the reception buffer time/processing parameter setting unit 139 terminates the reception buffer time/processing parameter setting process, returns the process to step S101 of FIG. 7, and performs the process at step S102.

As described above, by performing various setting, the transmission device 101 and the reception device 103 are capable of securing each delay time and waiting time as long as possible to the extent not to increase a delay, whereby the spare time can be used for the improvement of the image quality and the transmission quality.

To be more specific, the transmission device 101 is capable of setting the "variable compression encoding delay time" of the encoding unit 131 to the extent, not to increase a delay, and is capable of setting a larger encoder assumed buffer size B (byte). Also, the transmission device 101 is capable of setting the "redundant encoding block waiting time" of the FEC unit 132 to the extent not to increase a delay, and is capable of setting a larger FEC block and larger redundancy.

The reception device 103 is capable of setting a longer "ARQ retransmission packet waiting time" of the ARQ unit 206 to the extent not to increase a delay. Also, the reception device 103 is capable of setting a longer "network jitter handling buffer time" of the reception buffer 202 to the extent not to increase a delay.

As described above, the transmission device 101 and the reception device 103 are capable of reducing a waste of a delay time by utilizing the spare time of each process and using it for the improvement of the image quality and the transmission quality. That is, the transmission device 101 and the reception device 103 are capable of suppressing deterioration of the content quality by the above-described various processes in relation to the data transmission.

2. Second Embodiment

[A Configuration of a Transmission System]

Note that, although it has been described that the adjustment of the reception buffer time is performed only according to the network condition, it is not limited to the above description. For example, it may be configured to cause a user and the like to input a request about the image quality or the transmission quality and to adjust the reception buffer time based on the input.

Also, the reception buffer time may be renewed during the data transmission.

Figure 13:
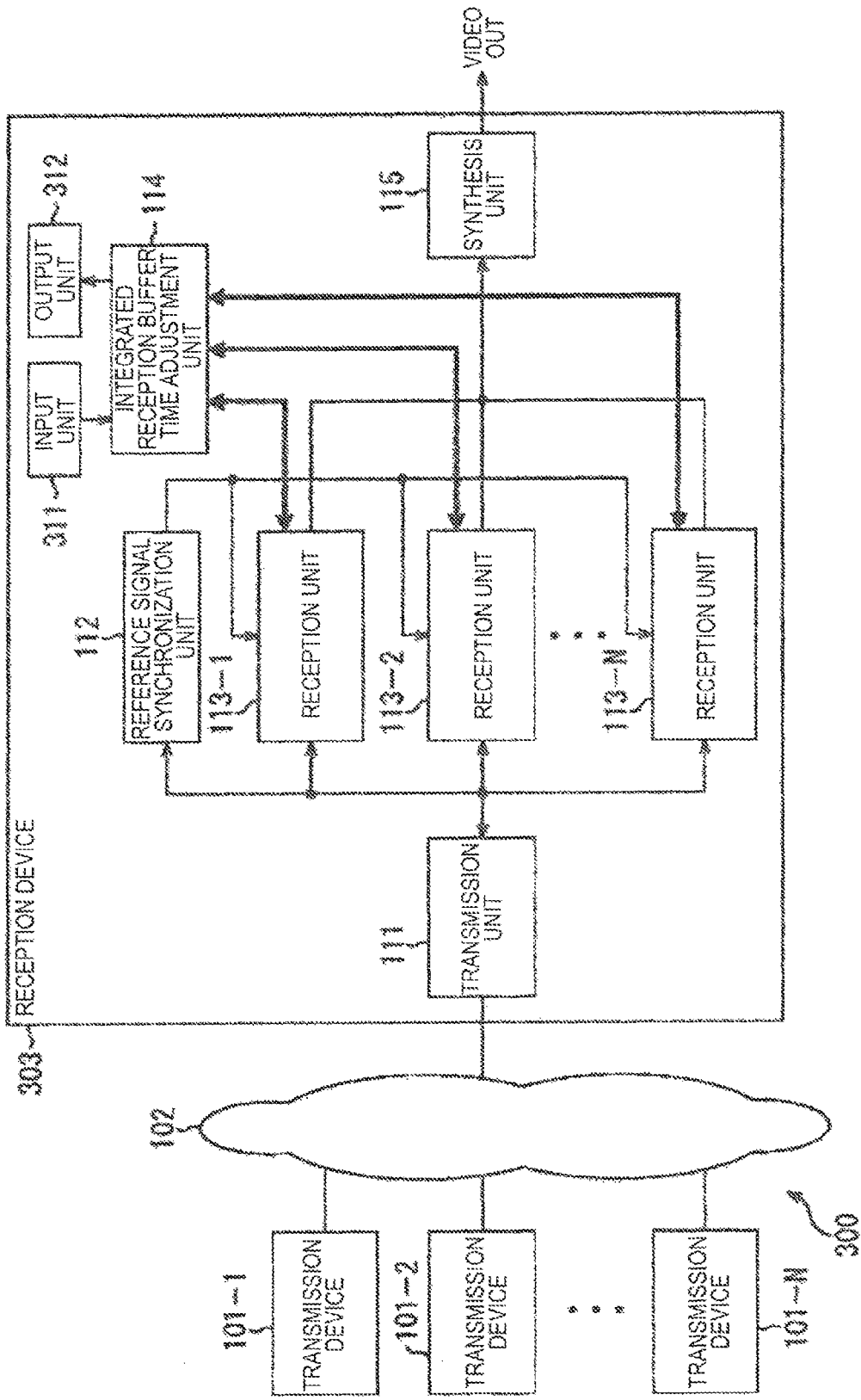
FIG. 13 is a block diagram snowing a main configuration of a transmission system to which the present invention is applied.

FIG. 13 is a block diagram showing a configuration example of the transmission system of that case.

Although a transmission system 300 shown in FIG. 13 has basically a similar system to the transmission system 100 of FIG. 1, the transmission system 300 includes a reception device 303 instead of the reception device 103. The reception device 303 is basically a similar device to the reception device 103, but includes an input unit 311 and an output unit 312 in addition to a configuration of the reception device 103.

The input unit 311 is configured from an arbitrary input device such as a keyboard, a mouse, a touch panel, and a switch, an external input terminal, and the like, receives an image quality request and a transmission quality request from outside of the reception device 303 such as a user, and supplies it to an integrated reception buffer time adjustment unit 114.

The output unit 312 is configured from an arbitrary output device such as a monitor and a speaker, an external output terminal, and the like, and displays a GUI image supplied from the integrated reception buffer time adjustment unit 114 and outputs a sound to output an input announcement and an input result of the image quality request and the transmission quality request.

Figure 14:
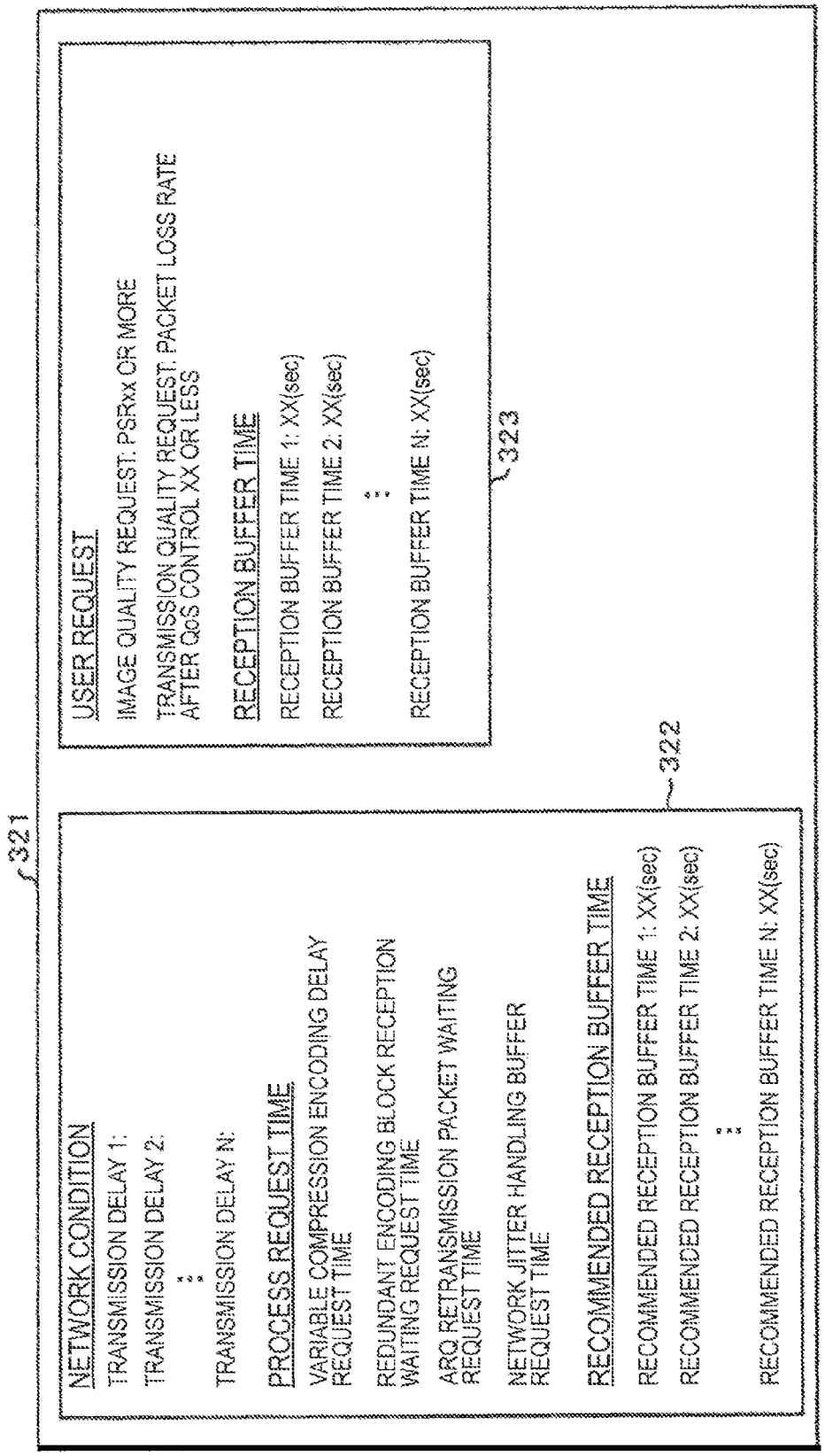
FIG. 14 is a diagram showing a display example of a request reception screen.

FIG. 14 is a diagram showing a display example of a request reception screen, which is a GUI receiving the image quality request, the transmission quality request, and the like. As shown in FIG. 14, a request reception screen 321 includes a display unit 322 and a request unit 323. An item that can be input by the user is shown on the request unit 323. A result of information input by the user is shown on the display unit 322.

It is shown that, in the request unit 323, for example, an "image quality request" and a "transmission quality request" can be input as a "user request". For example, in a case where the image quality is specified, the user selects the "image quality request" and inputs quality to be requested (for example, a PSR value and the like). Also, for example, in a case where the transmission quality is specified, the user selects the "transmission quality request" and inputs quality to be requested (for example, a packet loss rate after QoS control, and the like).

Note that the user can specify a reception buffer time on the request unit 323. For example, the user selects a "reception buffer time" and inputs a time to request, so that an allowable longest time as the "reception buffer time" can be set.

Various types of information that reflect the information input to the request unit 323 are displayed on the display unit 322.

For example, a "transmission delay" as a "network condition" is displayed on the display unit 322 for each transmission device. Obviously, information other than the above may be displayed.

Also, for example, as a "process request time", a "variable compression encoding delay request time", a "redundant encoding block reception request waiting time", an "ARQ retransmission packet waiting request time", and a "network jitter handling buffer request time", and the like are displayed on the display unit 322.

Further, for example, a "recommended reception buffer time" recommended as the reception buffer time is displayed on the display unit 322 for each transmission device.

The user can more easily set the image quality request, the transmission quality request, the reception buffer time, and the like by inputting a request based on such a GUI.

[A Whole Data Transmission Process]

An example of a flow of a data transmission process of the above case will be described with reference to a flowchart of FIG. 15.

Figure 15:
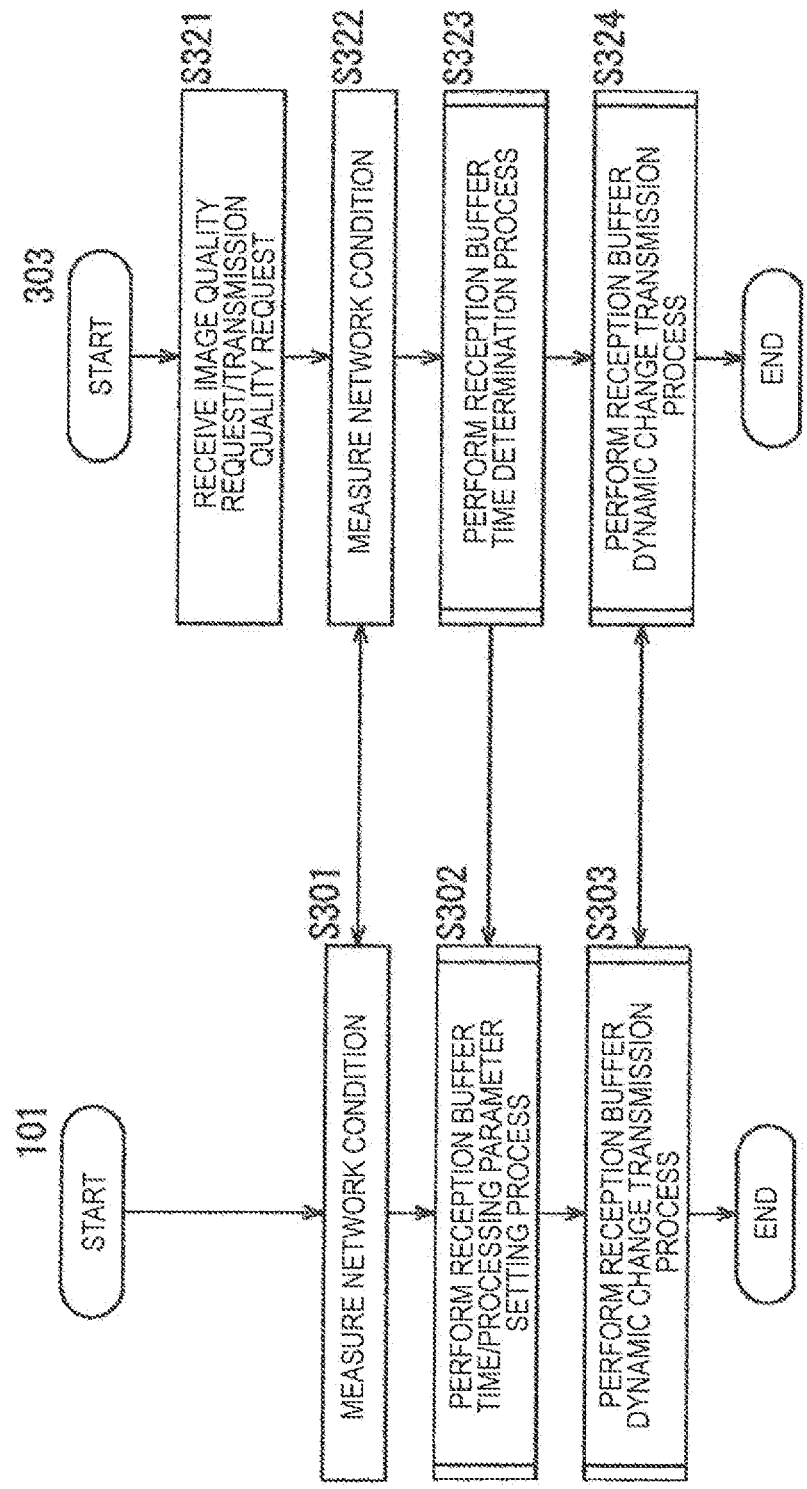
FIG. 15 is a flowchart describing another example of a flow of a data transmission process.

In this case, as shown in FIG. 15, the reception device 303 firstly controls the input unit 311 and the output unit 312 to receive the image quality request and the transmission quality request at step S321. The image quality request is a request for the image quality of a decoded image (an image of video data output from the reception device 303). The transmission quality request is a request for the packet loss rate and the like of a network 102. The reception device 303 uses the received image quality request and the transmission quality request for setting various parameters.

Subsequent processes are similar to the case described with reference to the flowchart of FIG. 9. That is, each process from steps S301 to S303 of FIG. 15 corresponds to each process from steps S101 to S103 of FIG. 9, and each, process from steps S322 to S324 of FIG. 15 corresponds to each process from steps S121 to S123 of FIG. 9.

Note that, at step S323 of FIG. 15, a reception buffer time determination process is performed using a request received at step S321. Also, at steps S303 and S324 of FIG. 15, a reception buffer dynamic change transmission process is performed in which the reception buffer time is renewed while the data transmission is performed.

[A Reception Buffer Time Determination Process]

Next, an example of a flow of a reception buffer time determination process executed in step S323 of FIG. 15 will be described with reference to flowcharts of FIGS. 16 and 17.

In this case, basically, each process is also performed in a similar manner to the case described with reference to the flowchart of FIG. 10. Note that, in this case, the integrated reception buffer time adjustment unit 114 obtains a provisional reception buffer time (provisional reception buffer time) of each reception unit 113 instead of using the prescribed reception buffer time before obtaining a maximum transmission delay time.

That is, the integrated reception buffer time adjustment unit 114 selects a reception unit 113 to be processed at step S341 and calculates the "variable compression encoding delay request time", the "redundant encoding block reception waiting request time", the "ARQ retransmission packet waiting request time", and the "network jitter handling buffer request time" using the image quality request and the transmission quality request with respect to data transmission of the reception unit 113 to be processed at step S342.

At step S343, the integrated reception buffer time adjustment unit 114 sets a maximum value of the calculated "variable compression encoding delay request time", "redundant encoding block reception waiting request time", "ARQ retransmission packet waiting request time", and "network jitter handling buffer request time" as the provisional reception buffer time.

The integrated reception buffer time adjustment unit 114 determines whether all of the reception units 113 to be used for the data transmission have been processed at step S344, and repeats the processes from steps S341 to S344 until ail of the reception units 113 are processed.

Figure 10:
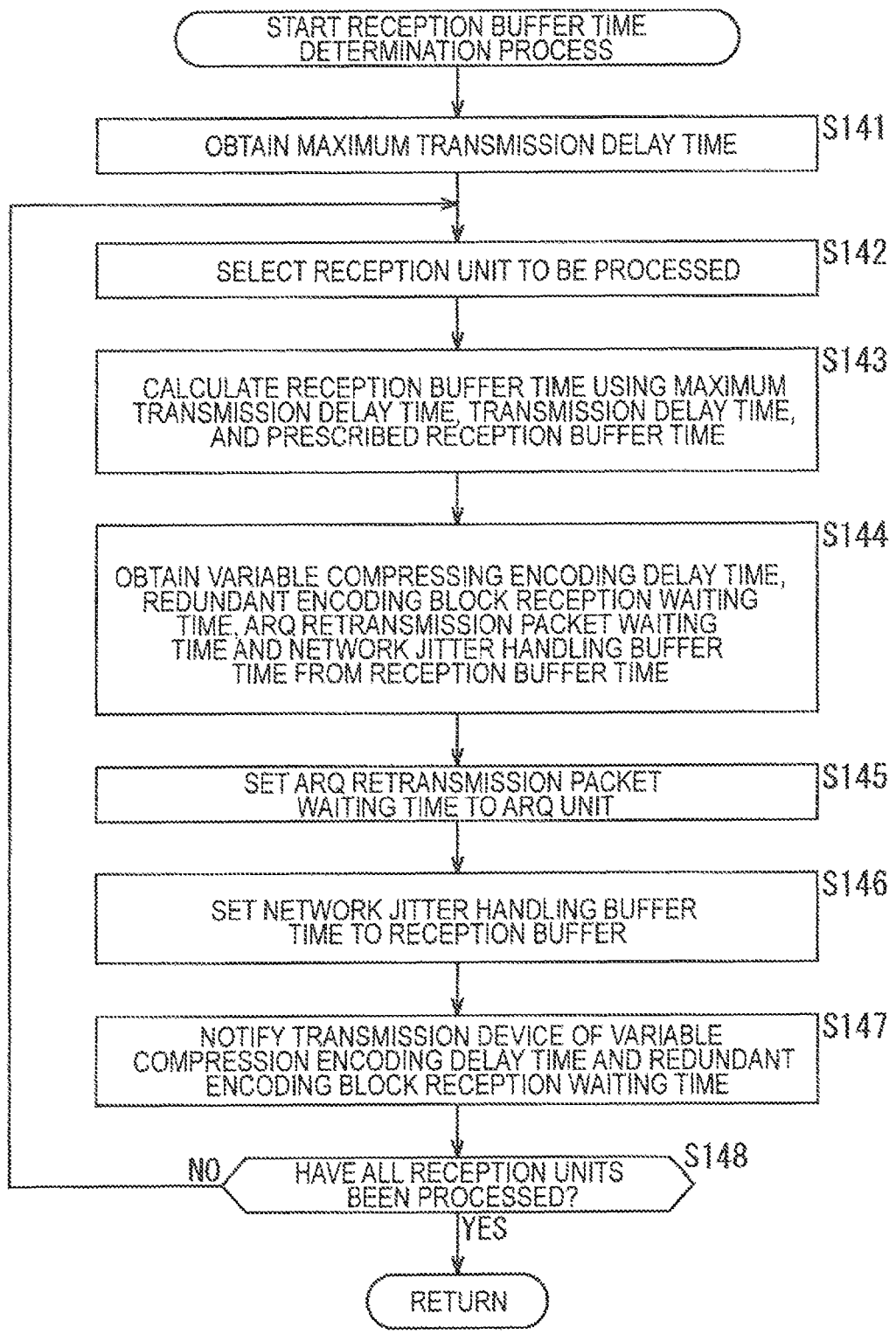
FIG. 10 is a flowchart describing an example of a flow of a reception buffer time determination process.

When the provisional reception buffer times of all of the reception units 113 have been set, the integrated reception buffer time adjustment unit 114 proceeds with the process to step S345 and obtains a maximum transmission delay time in a similar manner to the case of step S141 of FIG. 10.

That is, in this case, the reception buffer times of the reception units 113 calculated without considering the transmission delays are not a common prescribed reception buffer time and are individually set provisional reception buffer times, and there is a possibility that the lengths thereof are different from each other.

Figure 17:
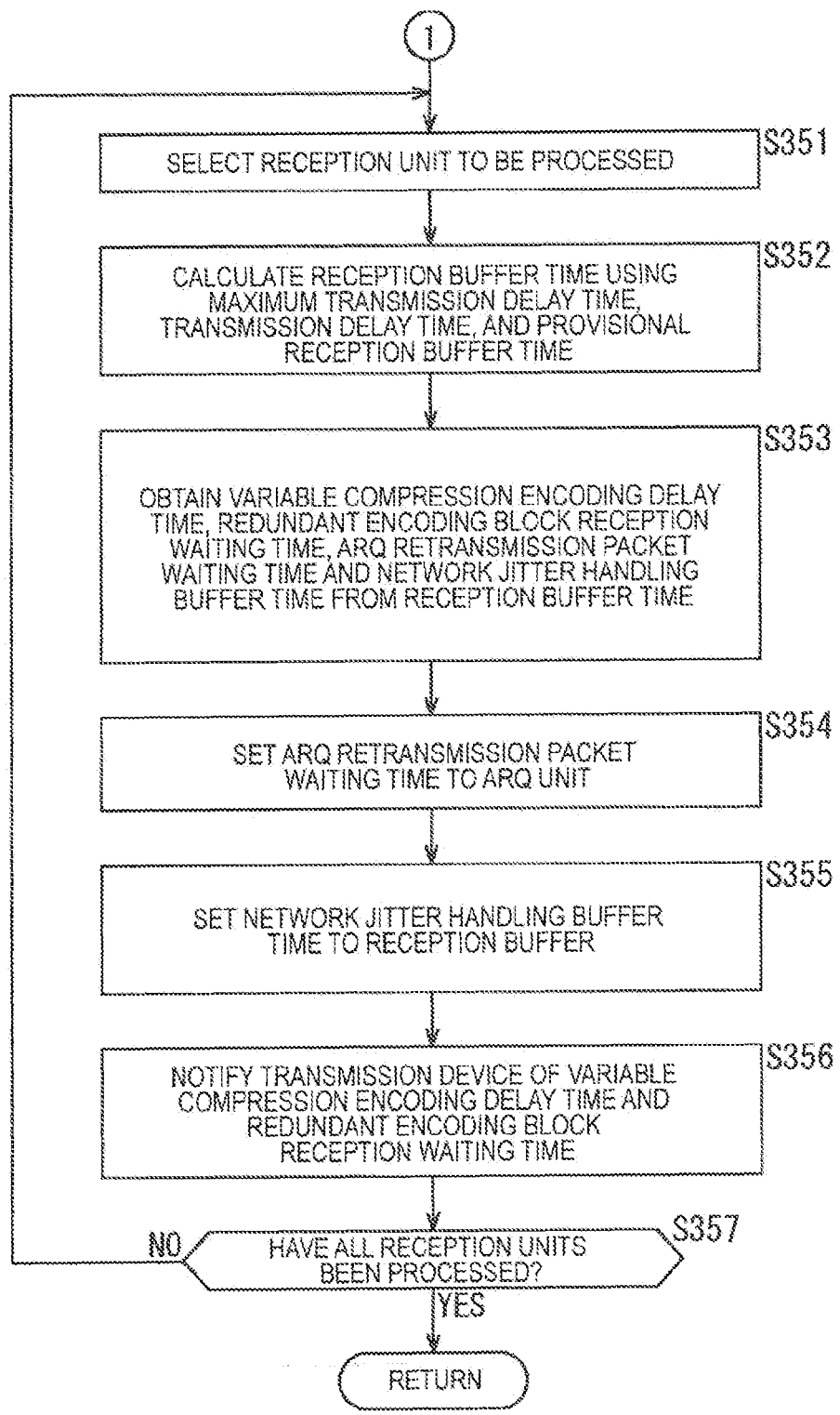
FIG. 17 is a flowchart following FIG. 16 describing the example of the flow of the reception buffer time determination process.

However, in this case, a calculation method of the reception buffer time is basically similar to the case of FIG. 10, and each process of steps S351 to S357 of FIG. 17 is performed in a similar manner to each process of steps S142 to S148 of FIG. 10 except that a maximum value (maximum transmission delay time) of the provisional reception buffer time is applied instead of the prescribed reception buffer time.

Further, a reception buffer time/processing parameter setting process by each transmission device 101 is performed in a similar manner to the case described with reference to the flowchart of FIG. 12.

As described above, when the image quality request and the transmission quality request are received from the user and the reception buffer time is determined according to the request, similar to the first embodiment, a spare time of each process is efficiently used for the improvement of the image quality and the transmission quality, whereby a waste of a delay time can be reduced. That is, deterioration of content quality can be suppressed.

[A Reception Buffer Dynamic Change Transmission Process]

Figure 18:
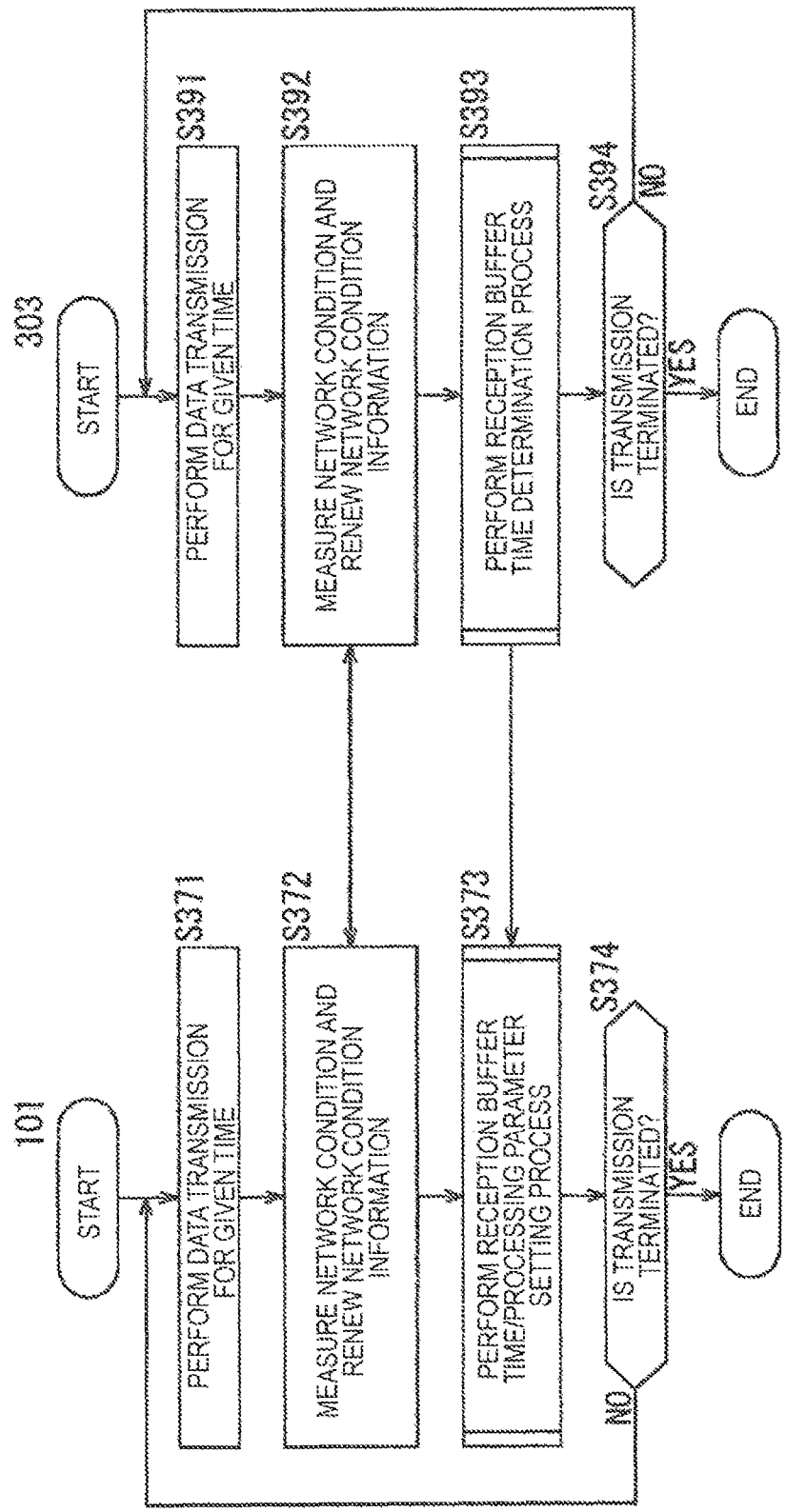
FIG. 18 is a flowchart describing an example of a flow of a reception buffer dynamic change transmission process.

Next, an example of a flow of the reception buffer dynamic change transmission process performed by the transmission device 101 and the reception device 303 will be described with reference to a flowchart of FIG. 18.

At step S371, each part of the transmission device 101 performs data transmission in a given time. In response to this process, each part of the reception device 303 performs data transmission in a given time at step S391.

An RTCP unit 207 of the reception device 303 performs data transmission/reception with an RTCP unit 137, measures a network condition, and renews network condition information at step S392. In response to this process, the RTCP unit 137 of the transmission device 101 measures the network condition and renews the network condition information at step S372.

At step S393, a reception buffer time setting unit 208 of the reception device 303 performs the reception buffer time determination process based on the renewed network condition information and renews the "variable compression encoding delay request time", the "redundant encoding block reception waiting request time", the "ARQ retransmission packet waiting request time", the "network jitter handling buffer request time" and the like. The setting of the "variable compression encoding delay time", the "redundant encoding block reception waiting time", the "ARQ retransmission packet waiting time", the "network jitter handling buffer time", and the like are renewed in accordance with the renewed various request times using the formulas (4) and (5).

Figure 16:
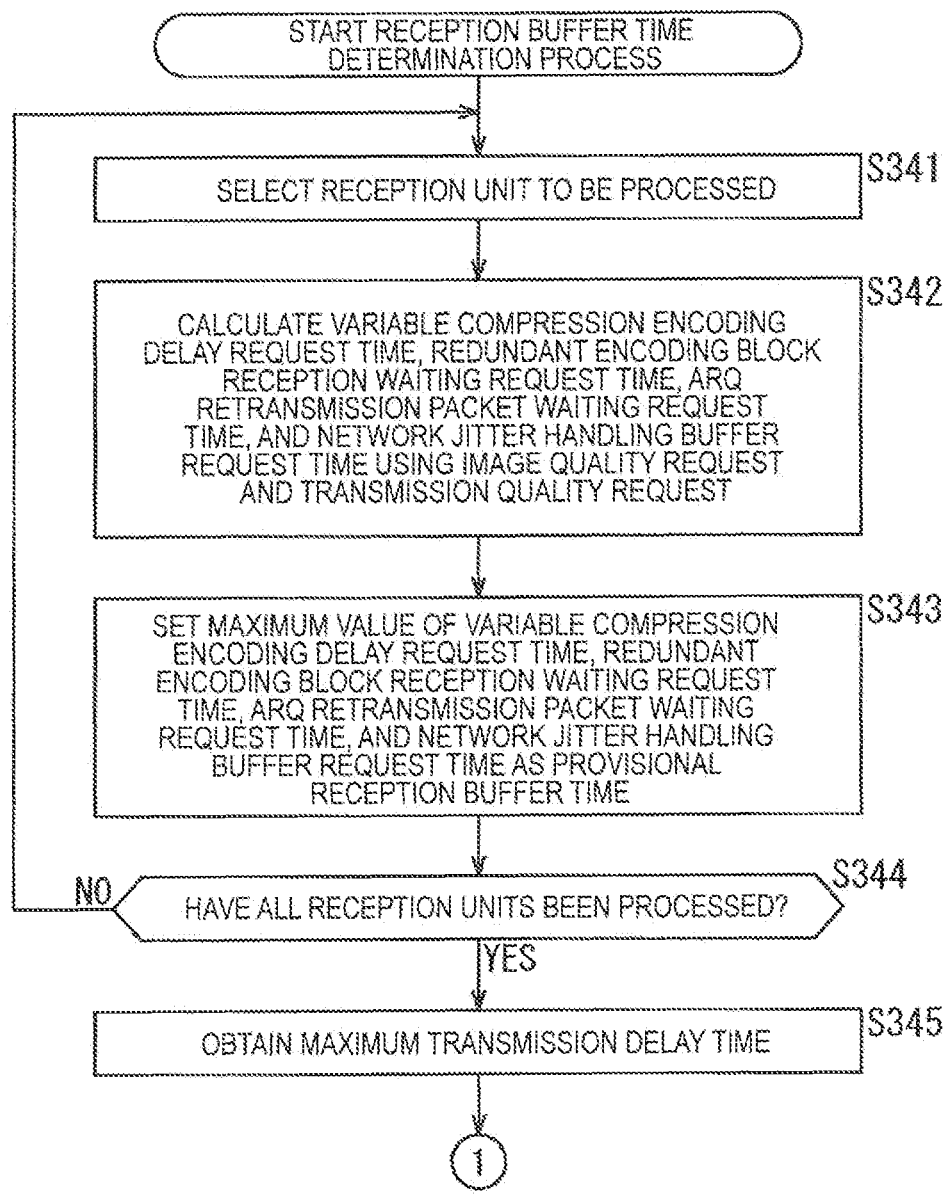
FIG. 16 is a flowchart describing an example of a flow of a reception buffer time determination process.

This reception buffer time determination process is performed in a similar manner to the case of FIGS. 16 and 17.

In response to this process, a reception buffer time/processing parameter setting unit 139 of the transmission device 101 performs the reception buffer time/processing parameter setting process at step S373. This process is performed in a similar manner to the case of FIG. 12.

In a case after the start of encoded data transmission, the reception buffer time/processing parameter setting unit 139 determines the number of original data packets k and the number of redundant packets n-k using a packet loss rate p included in the network condition information measured by the RTCP unit 137 using the encoded data transmission so as to satisfy the formula (3).

At step S374, the transmission device 101 determines whether the transmission is terminated, and when it is determined that the transmission is terminated, the transmission device 101 returns the process to step S371 and causes the subsequent processes to be executed. Also, at step S374, when it is determined that the transmission is terminated, the reception buffer dynamic change transmission process by the transmission device 101 is terminated.

Also, at step S394, the reception device 303 determines whether the transmission is terminated, and when it is determined that the transmission is terminated, the reception device 303 returns the process to step S391 and causes the subsequent processes to be executed. Also, at step S394, when it is determined that the transmission is terminated, the reception buffer dynamic change transmission process by the reception device 303 is terminated.

As described above, the transmission device 101 and the reception device 303 are capable of efficiently setting the image quality and the transmission quality in accordance with an actual condition, whereby the waste of the delay time can be further reduced by setting the parameters and the like in accordance with not only the requests from the user and the like but also the network condition. That is, the transmission device 101 and the reception device 303 are capable of suppressing the deterioration of the content quality.

As described above, in a case where a moving image is transmitted from a plurality of transmission devices, a synchronization process is performed in a reception device, and a QoS control process such as a variable compression encoding process, an FEC is performed, a larger variable compression encoding request time, redundant encoding block reception waiting time, ARQ retransmission packet waiting time, and network jitter handling buffer time can be set with respect to the data transmission with a small transmission delay, whereby the picture quality and the transmission quality can be improved at a maximum.

Note that, although it has been described such that the video data to be transmitted is encoded, it is not limited to the above embodiment and uncompressed data as is may be transmitted.

3. Third Embodiment

[A Personal Computer]

The above-described series of processes may be executed by hardware and may also be executed by software. In this case, for example, it may be configured as a personal computer shown in FIG. 19.

Figure 19:
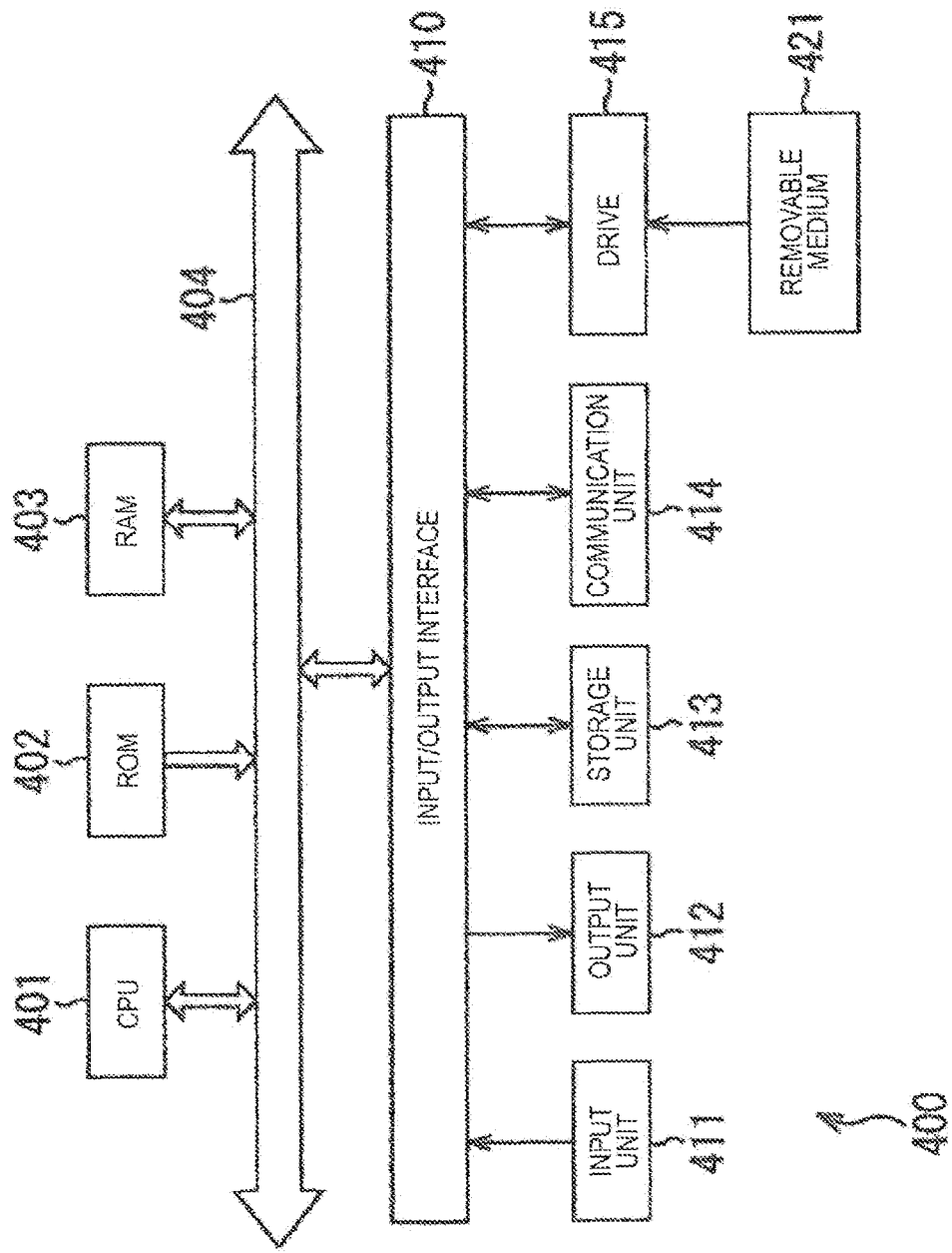
FIG. 19 is a block diagram showing a main configuration of a personal computer to which the present invention is applied.

In FIG. 19, a central processing unit (CPU) 401 of a personal computer 400 executes various processes according to a program stored in a read only memory (ROM) 402 or a program loaded from a storage unit 413 to a random access memory (RAM) 403. Data and the like necessary for various processes executed by the CPU 401 are also properly stored in the RAM 403.

The CPU 401, the ROM 402, and the RAM 403 are mutually connected via a bus 404. An Input/output interface 410 is also connected to the bus 404.

An input unit 411 configured from a keyboard, a mouse, and the like, a display configured, from a cathode ray tube (CRT), a liquid crystal display (LCD), and the like, an output unit 412 configured from a speaker and the like, a storage unit 413 configured from hard disk and the like, and a communication unit 414 configured from a modem and the like are connected to the input/output interface 410. The communication unit 414 performs a communication process via a network including the internet.

A drive 415 is also connected to the input/output interface 410 as needed, a removable medium 421 such as a magnetic disk, an optical disk, a magneto optical disk, and a semiconductor memory is properly mounted, and a computer program read out therefrom is installed into the storage unit 413, as needed.

When the above-described series of processes are executed by software, a program that constitutes the software is installed from the network or a recording medium.

This recording medium is, as shown in FIG. 19, other than the main device, configured not only from the removable medium 421 such as a magnetic disk (including a flexible disk), an optical disk (including a compact disc-read only memory (CD-ROM) and a digital versatile disc (DVD)), a magneto optical disk (including a mini disc (MD)), and a semiconductor memory, on which the program is recorded and which is distributed for delivering the program to the user, but also from the ROM 402 on which the program is recorded, or the hard disk included in the storage unit 413, which is incorporated in the main device in advance and delivered to the user.

Note that the program executed by the computer may be a program time-sequentially performed along the order described in the present specification, or may foe a program executed in parallel or executed at a necessary timing such as upon calling.

Also, in the present specification, the steps describing the program recorded in the recording medium include not only the process time-sequentially performed along the described order, but also a process executed individually or in parallel even if it is not necessarily time-sequentially performed.

Also, in the present specification, the "system" represents a whole apparatus configured from a plurality of devices (apparatuses).

Also, the configuration that has been described in the above embodiments as one device (or a processing unit) may be divided and configured from a plurality of devices (or processing units). On the contrary, the configuration that has been described in the above embodiments as a plurality of devices (or processing units) may be configured from an integrated one device (or a processing unit). Further, a configuration other than the above-described configuration of each device (or each processing unit) may be obviously added. Further, a part of the configuration of a certain device (or a processing unit) may be included, in a configuration of other device (or other processing unit) as long as the configuration or the operation as the whole system is substantially the same. That is, the embodiment of the present invention is not limited to the above-described embodiments and various modifications may be made without departing from the scope of the present invention.

REFERENCE SIGNS LIST

100 Transmission system
101 Transmission device
102 Network
103 Reception device
111 Transmission unit
112 Reference signal synchronization unit
113 Reception unit
114 Integrated reception buffer time adjustment unit
115 Synthesis unit
131 Encoding unit 132 FEC unit
133 RTP unit
134 Smoothing unit
135 Reference signal synchronization unit
136 Media synchronization unit
137 RTCP unit
138 ARQ unit
139 Reception buffer time/processing parameter setting unit
141 Rate control unit
201 Reception unit
202 Reception buffer
203 RTP unit
204 FEC unit
205 Decoding unit
206 ARQ unit
207 RTCP unit
205 Reception buffer time setting unit
210 Media synchronization unit
300 Transmission system
303 Reception device
311 Input unit
312 Output unit

The invention claimed is:

1. An information processing apparatus, comprising:
an adjustment means configured to adjust, in data transmission for transmitting mutually synchronized data from a plurality of transmission devices to a reception device, a reception buffer time that is a buffer time for synchronizing each of data in the reception device and is set for each of the data transmission using a difference in transmission delays that are a delay time generated in a transmission line of each of the data transmission; and
a setting means configured to set a parameter of a process in relation to each of the data transmission using the reception buffer time adjusted by the adjustment means.

2. The information processing apparatus according to claim 1,
wherein the adjustment means obtains a maximum value of the transmission delays, and obtains the reception buffer time by adding a difference between the transmission delay of each of the data and the maximum value to a prescribed reception buffer time that is a predetermined reception buffer time.

3. The information processing apparatus according to claim 1,
wherein the process in relation to the data transmission is a QoS control process of the data transmission, and
the setting means sets, as the parameter of the QoS control process, a redundant encoding block reception waiting time that is a time from when a head packet of a redundant encoding block is received until a tailing packet of the redundant encoding block is received, a retransmission packet waiting time that is a time for waiting a retransmission packet, and a network jitter handling buffer time for absorbing a network jitter.

4. The information processing apparatus according to claim 1,
wherein the data is encoded in a transmission source, obtained encoded data is transmitted, and the encoded data is decoded in a transmission destination, and
the setting means sets, as the parameter of the process, a variable compression encoding delay request time necessary when the encoded data rate-controlled and generated at the encoding is subjected to smoothing-transmission.

5. The information processing apparatus according to claim 1, further comprising:
a reception means configured to receive an image quality request that is a request in relation to image quality of the data and a transmission quality request that is a request in relation to transmission quality in the data transmission,
wherein the adjustment means adjusts the reception buffer time based on the image quality request and the transmission quality request received by the reception means.

6. The information processing apparatus according to claim 5,
wherein the adjustment means sets a provisional reception buffer time based on the image quality request and the transmission quality request received by the reception means, and adjusts the reception buffer time based on the provisional reception buffer time.

7. The information processing apparatus according to claim 5, further comprising:
an output means configured to display a GUI supporting an input of the image quality request and the transmission quality request received by the reception means.

8. An information processing method to be performed by an information processing apparatus, comprising:
in data transmission for transmitting mutually synchronized data from a plurality of transmission devices to a reception device, adjusting, by an adjustment means of the information processing apparatus, a reception buffer time that is a buffer time for synchronizing each of data in the reception device and is set for each of the data transmission using a difference in transmission delays that are a delay time generated in a transmission line of each of the data transmission; and
setting, by a setting means of the information processing apparatus, a parameter of a process in relation to each of the data transmission using the adjusted reception buffer time.

9. A non-transitory computer readable storage medium storing a program that, when read by a computer, causes the computer to function as:
an adjustment means that adjusts, in data transmission for transmitting mutually synchronized data from a plurality of transmission devices to a reception device, a reception buffer time that is a buffer time for synchronizing each of data in the reception device and is set for each of the data transmission using a difference in transmission delays that are a delay time generated in a transmission line of each of the data transmission; and
a setting means that sets a parameter of a process in relation to each of the data transmission using the reception buffer time adjusted by the adjustment means.

* * * * *